United States Patent
Kakuta et al.

(10) Patent No.: US 7,449,132 B2
(45) Date of Patent: Nov. 11, 2008

(54) PROTON CONDUCTIVE COMPOSITION AND PROTON CONDUCTIVE MEMBRANE

(75) Inventors: Mayumi Kakuta, Tokyo (JP); Toshihiro Otsuki, Tokyo (JP); Nagayuki Kanaoka, Wako (JP); Masaaki Nanaumi, Wako (JP); Yoichi Asano, Wako (JP); Ryoichiro Takahashi, Wako (JP)

(73) Assignees: JSR Corporation, Tokyo (JP); Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 10/995,247

(22) Filed: Nov. 24, 2004

(65) Prior Publication Data
US 2005/0116206 A1 Jun. 2, 2005

(30) Foreign Application Priority Data
Nov. 28, 2003 (JP) ............................. 2003-399666

(51) Int. Cl.
H01B 1/00 (2006.01)
H01M 8/10 (2006.01)
(52) U.S. Cl. .................... 252/500; 252/514; 252/520.1; 252/520.2; 429/30; 429/33
(58) Field of Classification Search ................ 252/500, 252/511, 514, 520.1, 520.2; 429/30, 33
See application file for complete search history.

(56) References Cited

U.S. PATENT DOCUMENTS

| | | | | |
|---|---|---|---|---|
| 5,334,292 | A | * 8/1994 | Rajeshwar et al. | 205/419 |
| 5,403,675 | A | * 4/1995 | Ogata et al. | 429/33 |
| 5,468,574 | A | 11/1995 | Ehrenberg et al. | |
| 5,906,716 | A | * 5/1999 | Mertesdorf et al. | 204/296 |
| 6,462,095 | B1 | * 10/2002 | Bonsel et al. | 516/97 |
| 7,115,699 | B2 | 10/2006 | Yamakawa et al. | |
| 2001/0041279 | A1 | 11/2001 | Terahara et al. | |
| 2002/0127474 | A1 | * 9/2002 | Fleischer et al. | 429/309 |
| 2002/0164513 | A1 | 11/2002 | Asano et al. | |
| 2002/0172850 | A1 | 11/2002 | Asano et al. | |
| 2002/0177656 | A1 | 11/2002 | Goto et al. | |
| 2003/0100443 | A1 | * 5/2003 | Bender et al. | 502/159 |
| 2003/0235737 | A1 | * 12/2003 | Jeon et al. | 429/30 |
| 2004/0101730 | A1 | 5/2004 | Hirano et al. | |
| 2004/0121211 | A1 | 6/2004 | Asano et al. | |
| 2004/0138352 | A1 | 7/2004 | Taniguchi et al. | |
| 2004/0180250 | A1 | 9/2004 | Nanaumi et al. | |
| 2004/0197632 | A1 | 10/2004 | Sohma et al. | |
| 2005/0186460 | A1 | 8/2005 | Kanaoka et al. | |
| 2006/0127728 | A1 | 6/2006 | Otsuki et al. | |

FOREIGN PATENT DOCUMENTS

| | | |
|---|---|---|
| DE | 102 01 886 A1 | 8/2002 |
| EP | 0 041 780 A1 | 12/1981 |
| EP | 0 317 226 A2 | 5/1989 |
| EP | 1 138 712 A2 | 10/2001 |
| EP | 1 138 712 A3 | 10/2001 |
| EP | 1 245 554 A1 | 10/2002 |
| EP | 1 245 555 A1 | 10/2002 |
| EP | 1 329 444 A1 | 7/2003 |
| EP | 1 420 473 A1 | 5/2004 |
| EP | 1 517 390 A2 | 3/2005 |
| EP | 1 524 288 A2 | 4/2005 |
| JP | 2-159 | 1/1990 |
| JP | 07-090111 A | 4/1995 |
| JP | 9-251857 | 9/1997 |
| JP | 2001-192531 | 7/2001 |
| JP | 2001-250567 A | 9/2001 |
| JP | 2001-307752 | 11/2001 |
| JP | 2002-298856 | 11/2002 |
| JP | 2003-142125 | 5/2003 |
| JP | 2003-183526 | 7/2003 |
| JP | 2004-175997 | 6/2004 |
| JP | 2005-190702 | * 7/2005 |
| SG | 75833 | * 10/2000 |
| WO | WO 95/32236 | 11/1995 |
| WO | WO 02/080294 | 10/2002 |

(Continued)

OTHER PUBLICATIONS

Bates, Frank S., et al., "Block Copolymer Thermodynamics: Theory and Experiment," Annual Review of Physical Chemistry, 1990, vol. 41, pp. 525-557.

(Continued)

Primary Examiner—Mark Kopec
Assistant Examiner—Jaison P Thomas
(74) Attorney, Agent, or Firm—Arent Fox LLP

(57) ABSTRACT

The present invention provides a proton conductive membrane having capabilities of self-generating water and maintaining water, excellent ion conductivity and excellent effect of inhibiting crossover and usable for solid polymer electrolyte type fuel cells and also provides a proton conductive composition used for preparing the proton conductive membrane. The proton conductive composition comprises 100 parts by weight of a polyarylene having a sulfonic group and 0.01 to 80 parts by weight of at least one metal catalyst selected from the group consisting of platinum, gold, palladium, rhodium, iridium and ruthenium, or comprises 100 parts by weight of a polyarylene having a sulfonic group, 0.01 to 80 parts by weight of the metal catalyst, and 0.01 to 50 parts by weight of metal oxide fine particles and/or fibers in total.

6 Claims, No Drawings

FOREIGN PATENT DOCUMENTS

| WO | WO 02/101860 | 12/2002 |
|---|---|---|
| WO | WO 03/033566 A1 | 4/2003 |

OTHER PUBLICATIONS

Fedors, Robert F., "A Method for Estimating Both the Solubility Parameters and Molar Volumes of Liquids," Polymer Engineering and Science, Feb. 1974, vol. 14, No. 2, pp. 147-154.

Kobayashi, Takeshi, et al., "Preparation of Thermally Stable Proton Conducting Polymer," Polymer Preprints, Japan, vol. 42, No. 3, 1993, pp. E295 and 730.

Kobayashi, Takeshi, et al., "Preparation of Thermally Stable Proton Conducting Polymer (II)," Polymer Preprints, Japan, vol. 42, No. 7, 1993, pp. E928 and 2490-2492.

Kobayashi, Takeshi, et al., "Preparation of Thermally Stable Proton Conducting Polymer (V)," Polymer Preprints, Japan, vol. 43, No. 3, 1994, p. E441 and 736.

* cited by examiner

PROTON CONDUCTIVE COMPOSITION AND PROTON CONDUCTIVE MEMBRANE

FIELD OF THE INVENTION

The present invention relates to a proton conductive membrane having excellent proton conductivity and excellent effect of inhibiting crossover used as a solid polymer electrolyte membrane for solid polymer fuel cells, and relates to a proton conductive composition capable of preparing the proton conductive membrane.

BACKGROUND OF THE INVENTION

Examples of solid polymer electrolytes may include perfluoroalkylsulfonic acid, perfluoroalkylcarboxylic acid, sulfonated vinyl polymers such as polystyrene sulfonic acid and polymers obtainable by introducing a sulfonic or phosphoric group in a heat resistant polymer such as polybenzimidazole, polyether ketone and the like. Particularly, Nafion (Trade Mark) developed by Dupont Co., is known as a perfluoroalkylsulfonic acid type solid polymer electrolyte having excellent chemical stability. Further, a film made from the above solid polymer electrolyte is used for a proton exchange membrane of solid polymer electrolyte fuel cells.

It is said a proton transfer occurs in the presence of water. Therefore, when the solid polymer electrolyte membrane dries off, the specific resistance of the solid polymer electrolyte membrane becomes large and thereby the proton conductivity is lowered. Inversely, the more the solid polymer electrolyte membrane is moist, the smaller the specific resistance is. Therefore, it is possible to prepare a solid polymer electrolyte fuel cell having high performance. Further, a sufficiently moistened solid polymer electrolyte membrane prevents crossover such that hydrogen gas for feeding to an anode side and oxygen gas for feeding to a cathode side pass through the solid polymer electrolyte membrane as they are.

In order to improve the proton conductivity by inhibiting the fuel from crossover with keeping the solid polymer electrolyte membrane in a moisture state, it is very important to control the moisture of the solid polymer electrolyte membrane. As a conventional method of controlling the moisture of the solid polymer electrolyte membrane, disclosed are an indirect humidification method that hydrogen gas for feeding to an anode is saturated with water vapor to indirectly moisturize the solid polymer electrolyte membrane, and a direct humidification method that the solid polymer electrolyte membrane is made in a sandwich structure with sandwiching hydroscopic twisting-like fibers and the solid polymer electrolyte membrane is directly moisturized through the fibers (referred to JP-A-6(1994)-111827, JP-A-6(1994)-111834 and JP-A-7(1995)-90111).

The indirect humidification method, however, has problems such that it is difficult to control the water vapor pressure, and thereby the solid polymer electrolyte membrane is dried or the catalyst layer is moisturized too much to lower the performance. It further has defects such that operation with pressure is necessary because a large amount of water vapor is fed to hydrogen gas and the hydrogen gas is diluted and the partial pressure is lowered by the amount of the hydrogen gas diluted, and the performance is lowered because the diffusion of hydrogen gas in the electrode catalyst is inhibited.

As the countermeasure for the above problems, there is an attempt to thin the film thickness of the solid polymer electrolyte membrane for lowering the humidification amount with lowering the electric resistance of the membrane itself. The film thickness is decreased to cause a problem such that cross over of the fuel is easily induced and the cell voltage is lowered.

On the other hand, the direct humidification method has a problem such that because it has a sandwich structure with fibers sandwiched, the film thickness is increased and thereby the electric resistance is increased to lower the proton conductivity.

The present inventors have been studied on the problems associated with the prior art and earnestly studied in order to prepare a solid polymer electrolyte membrane having excellent proton conductivity and crossover inhibiting effect. They found that the proton conductive composition prepared by adding a metal catalyst to a polyarylene having a sulfonic group has capability of self-producing water, and due to the capability, the solid polymer electrolyte membrane is moisturized and thereby the proton conductivity thereof is improved and also the crossover can be inhibited.

They also found that when silica, the metal oxide fine particles and/or metal oxide fibers are added to polyarylene having a sulfonic group in addition to the above metal catalyst, the resulting proton conductive composition is improved on water-holding capability for holding water generated in the solid polymer electrolyte, and thereby drying in the solid polymer electrolyte is depressed, the proton conductivity is further improved and also the effect of inhibiting crossover is also further improved.

OBJECT OF THE INVENTION

The present invention is intended to solve the problems associated with the prior art and it is an object of the invention to provide a proton conductive membrane having water self-producing capability and water holding capability, and also having excellent ion conductivity and effect of inhibiting crossover which membrane is used as a solid polymer electrolyte membrane for solid polymer electrolyte fuel cells and the like, and it is another object of the invention to provide a proton conductive composition capable of preparing the proton conductive membrane.

SUMMARY OF THE INVENTION

According to the present invention, the following proton conductive composition and proton conductive membrane are provided and thereby the above object can be solved.

(1) The proton conductive composition of the present invention comprises 100 parts by weight of a polyarylene having a sulfonic group and 0.01 to 80 parts by weight of a metal catalyst comprising at least one metal catalyst selected from the group consisting of platinum, gold, palladium, rhodium, iridium and ruthenium.

(2) The proton conductive composition of the present invention comprises 100 parts by weight of a polyarylene having a sulfonic group, 0.01 to 80 parts by weight of at least one metal catalyst selected from the group consisting of platinum, gold, palladium, rhodium, iridium and ruthenium, and 0.01 to 50 parts by weight of fine particles of a metal oxide and/or fibers of the metal oxide in total.

(3) The proton conductive composition according to the property (2) is characterized in that the metal oxide is at least one selected from the group consisting of silica, titania, alumina, zirconia, magnesia and tin oxide.

(4) The proton conductive composition according to the property (2) is characterized in that the metal oxide is silica or titania.

(5) The proton conductive composition according to any one of the properties (1) to (4) is characterized in that the metal catalyst has an average particle diameter of not more than 0.1 μM.

(6) The proton conductive composition according to any one of the properties (2) to (5) is characterized in that the fine particles of the metal oxide have an average particle diameter of not more than 0.1 μm and the fibers of the metal oxide have a diameter of not more than 6 μm.

(7) The proton conductive composition according to any one of the properties (1) to (6) is characterized in that the polyarylene having a sulfonic group comprises a structural unit represented by the following formula (A) and optionally a structural unit represented by the following formula (B):

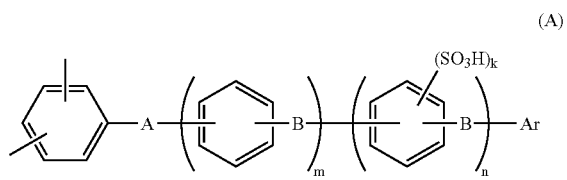

(A)

wherein A is a divalent electron-withdrawing group; B is a divalent electron-donating group or a direct bond; Ar is an aromatic group with a substituent —$SO_3H$; m is an integer of from 0 to 10; n is an integer of 0 to 10; and k is an integer of 1 to 4;

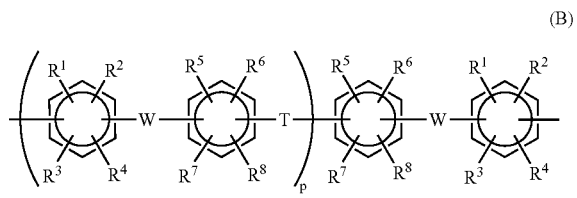

(B)

wherein $R^1$ to $R^8$ may be the same or different and each are at least one atom or group selected from the group consisting of hydrogen, fluorine atom, alkyl group, fluorine substituted alkyl group, allyl group, aryl group or cyano group; W is a divalent electron-withdrawing group or a single bond; T is a single bond or divalent organic group; and p is 0 or a positive integer.

(8) The proton conductive film of the present invention comprises the proton conductive composition as described in any one of the properties (1) to (7).

EFFECT OF THE INVENTION

The proton conductive composition containing a polyarylene having a sulfonic group, and a metal catalyst according to the present invention has capability of self-producing water. The proton conductive composition containing a polyarylene having a sulfonic group, a metal catalyst, metal oxide fine particles and/or fibers according to the present invention has capability of self-producing water and capability of holding water. When a proton conductive membrane prepared from these proton conductive compositions is used to a solid polymer electrolyte membrane for solid polymer electrolyte fuel cells and the like, the membrane has excellent proton conductivity and effect of inhibiting cross over.

BEST MODE FOR CARRYING OUT THE INVENTION

Hereinafter, the proton conductive composition and the proton conductive membrane according to the present invention will be described in detail.

The proton conductive composition of the present invention comprises a polyarylene having a sulfonic group, and a metal catalyst and optionally comprises fine particles of a metal oxide and/or fibers of the metal oxide.

(Metal catalyst)

Examples of the metal catalyst used in the invention may include platinum, gold, palladium, rhodium, iridium and ruthenium.

These metal catalysts have a particle diameter of preferably not more than 0.1 μm, more preferably from 0.1 to 0.001 μm, further preferably 0.01 to 0.001 μm. When the metal catalyst has a finer average particle diameter, it has better dispersibility to polyarylene having a sulfonic group and high effect of inhibiting crossover, and further the catalyst content can be decreased.

The metal catalyst is contained in an amount of from 0.01 to 80 parts by weight, preferably 0.1 to 15 parts by weight, based on 100 parts by weight of polyarylene having a sulfonic group. When the amount is less than 0.01 part by weight or over 80 parts by weight, the effect of improving the specific resistance cannot be observed optionally.

(Metal oxide)

The metal oxide fine particles used in the invention have an amorphous crystal structure and an average primary particle diameter of preferably not more than 0.1 μm, more preferably from 0.1 to 0.001 μm, furthermore preferably 0.01 to 0.001 μm. The metal oxide preferably has a high purity and a high specific surface area (BET method not less than 130 $m^2/g$).

The metal oxide fibers used in the invention desirably have a diameter of not more than 5 μm, preferably from 5 to 0.1 μm.

The particles having an average primary particle diameter of over 0.1 μm and the fiber having a diameter of over 5 μm are not practical because they have low effect of lowering the specific resistance of the solid polymer electrolyte composition.

The metal oxide is contained in an amount of desirably from 0.01 to 50 parts by weight, preferably 0.1 to 20 parts by weight, based on 100 parts by weight of polyarylene having a sulfonic group. When the amount of the metal oxide is less than 0.01 part by weight or over 50 parts by weight, the effect of improving the specific resistance cannot optionally be observed.

(Polyarylene Having a Sulfonic Group)

The polyarylene having a sulfonic group used in the present invention comprises a structural unit represented by the following formula (A) and optionally a structural unit represented by the following formula (B), and it is represented by, for example, the following formula (C).

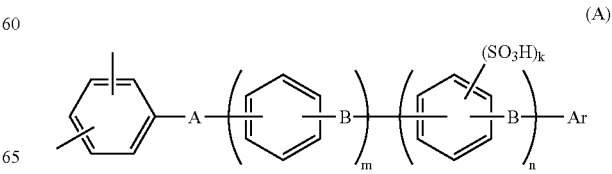

(A)

In the formula (A), A is a divalent electron-withdrawing group, such as —CO—, —SO$_2$—, —SO—, —CONH—, —COO—, —(CF$_2$)$_l$— (in which l is an integer of 1 to 10) and —C(CF$_3$)$_2$—.

B is a divalent electron-donating group or a direct bond. Examples of the electron-donating group may include —(CH$_2$)—, —C(CH$_3$)$_2$—, —O—, —S—, —CH=CH—, —C≡C—,

Herein, the electron-withdrawing group is a group having a Hammett substituent constant at the meta-position in phenyl group of not less than 0.06, and a Hammett substituent constant at the para-position in phenyl group of not less than 0.01.

Ar is an aromatic group having a substituent represented by —SO$_3$H. Examples of the aromatic group may include phenyl, naphthyl, anthryl and phenanthryl groups. Of these groups, phenyl and naphthyl groups are preferred.

m is an integer of from 0 to 10, preferably 0 to 2, n is an integer of 0 to 10, preferably 0 to 2 and k is an integer of 1 to 4.

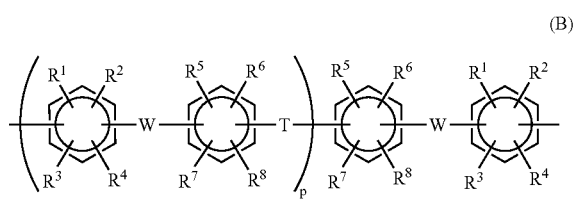

In the formula (B), R$^1$ to R$^8$ may be the same or different and each are at least one atom or group selected from the group consisting of hydrogen, a fluorine atom, alkyl group, fluorine substituted alkyl group, allyl group, aryl group and cyano group.

Examples of the alkyl group may include methyl, ethyl, propyl, butyl, amyl and hexyl groups. Methyl and ethyl groups are preferred.

Examples of the fluorine substituted alkyl group may include trifluoromethyl, perfluoroethyl, perfluoropropyl, perfluorobutyl, perfluoropentyl and perfluorohexyl groups. Trifluoromethyl and perfluoroethyl groups are preferred.

Examples of the allyl group may include propenyl group and the like, and examples of the aryl group may include phenyl and pentafluorophenyl groups.

W is a single bond or a divalent electron-withdrawing group. Examples of the divalent electron-withdrawing group may include the same groups as described above.

T is a single bond or divalent organic group. Examples of the divalent organic group may include an electron-withdrawing group and an electron-donating group. Examples of the electron-withdrawing group and the electron-donating group may include the same groups as described above.

In the formula (B), p is 0 or a positive integer generally up to 100 and is preferably from 10 to 80.

The polyarylene having a sulfonic group, which comprises the structural unit of the formula (A) and the structural unit of the formula (B), is a polymer represented by the following formula (C).

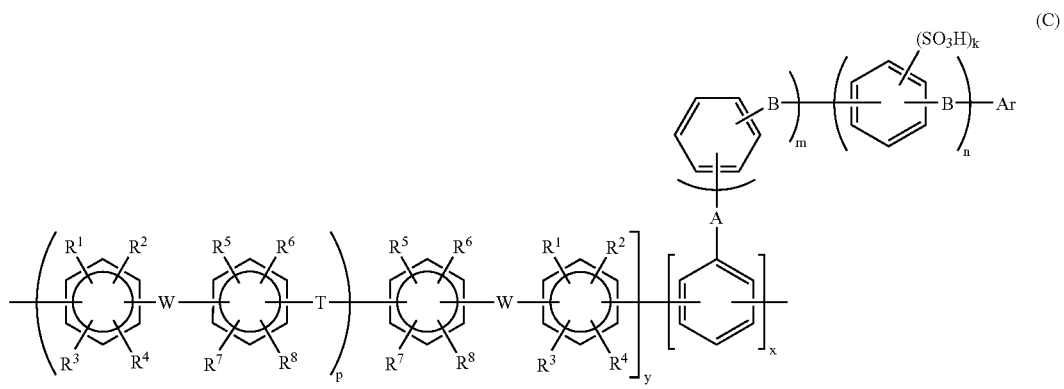

In the formula (C), W, T, A, B, Ar, m, n, k, p and R$^1$ to R$^8$ are same as W, T, A, B, Ar, m, n, k, p and R$^1$ to R$^8$ in the formulas (A) and (B), and x and y indicate a molar ratio such that x+y=100 mol %.

The polyarylene having a sulfonic group comprises the structural unit of the formula (A) in an amount of from 0.5 to 100 mol %, preferably 10 to 99.999 mol % and the structural unit of the formula (B) in an amount of from 99.5 to 0 mol %, preferably 90 to 0.001 mol %.

(Process for Preparing Polyarylene Having a Sulfonic Group)

The polyarylene having a sulfonic group can be synthesized in such a manner that a monomer having a sulfonate group capable of being the structural unit of the formula (A) is copolymerized optionally with an oligomer capable of being the structural unit of the formula (B) to prepare a polyarylene having a sulfonate group and the sulfonate group is transformed into a sulfonic group by hydrolysis of the polyarylene having a sulfonate group.

The polyarylene having a sulfonic group can also be synthesized in the manner that polyarylene, which comprises the structural unit having a skeleton represented by the formula (A) and having no sulfonic group nor sulfonate group, and optionally the structural unit of the formula (B), is previously synthesized and then this resulting polymer is sulfonated.

When the polyarylene having a sulfonic group is synthesized by copolymerization of a monomer capable of being the structural unit of the formula (A) optionally with an oligomer capable of being the structural unit of the formula (B), the monomer capable of being the structural unit of the formula (A) used herein may include sulfonate represented by the following formula (D) (hereinafter sometimes referred to "monomer D").

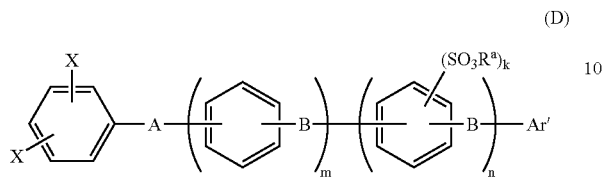

(D)

In the formula (D), X is an atom or group selected from the group consisting of a halogen atom excluding fluorine, such as chlorine, bromine or iodine and —$OSO_2Z$ in which Z is an alkyl group, fluorine substituted alkyl group and aryl group. A, B, m, n and k have the same meanings as A, B, m, n and k in the formula (A).

$R^a$ is a hydrocarbon group having 1 to 20 carbon atoms, preferably 4 to 20 carbon atoms. Specific examples thereof may include linear hydrocarbon groups, branched hydrocarbon groups, alicyclic hydrocarbon groups and hydrocarbon groups having a 5 membered hetero ring, such as methyl, ethyl, n-propyl, iso-propyl, tert-butyl, iso-butyl, n-butyl, sec-butyl, neopentyl, cyclopentyl, hexyl, cyclohexyl, cyclopentylmethyl, cyclohexylmethyl, adamantyl, adamanthanemethyl, 2-ethylhexyl, bicycle[2.2.1]heptyl, bicycle[2.2.1]heptylmethyl, tetrahydrofurfuryl, 2-methylbutyl, 3,3-dimethyl-2,4-dioxolanemethyl, cyclohexylmethyl, admanthylmethyl and bicycle[2.2.1]hepthylmethyl groups. Of these, n-butyl, neopentyl, tetrahydrofurfuryl, cyclopentyl, cyclohexyl, cyclohexylmethyl, adamanthylmethyl and bicycle[2.2.1]heptylmethyl groups are preferred and further neopentyl group is more preferred.

Ar' is an aromatic group having a sulfonate group represented by —$SO_3R^b$, and examples of the aromatic group may include phenyl, naphthyl, anthryl and phenanthryl groups. Of these, phenyl and naphthyl groups are preferred.

The aromatic group has at least one or two or more substituents represented by —$SO_3R^b$, and when it has two or more substituents —$SO_3R^b$, they may be the same or different.

Herein, $R^b$ is a hydrocarbon group having 1 to 20 carbon atoms, preferably 4 to 20 carbon atoms, and examples thereof may include the above hydrocarbon groups having 1 to 20 carbon atoms. Of these, n-butyl, neopentyl, tetrahydrofurfuryl, cyclopentyl, cyclohexyl, cyclohexylmethyl, adamanthylmethyl and bicycle[2.2.1]heptyl methyl groups are preferred, and further, neopentyl group is more preferred.

Examples of the sulfonates represented by the formula (D) may include the following compounds:

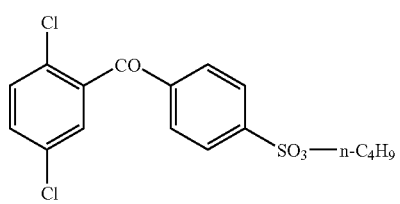

-continued

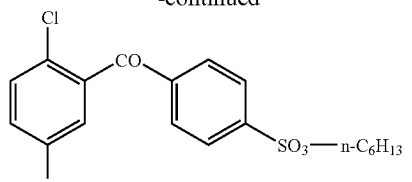

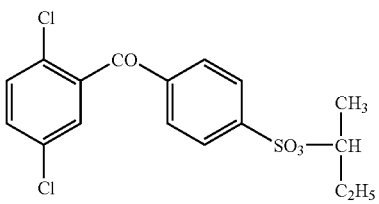

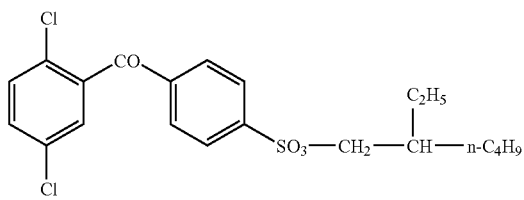

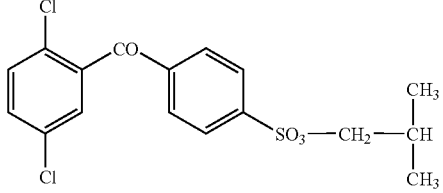

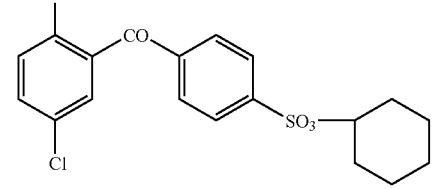

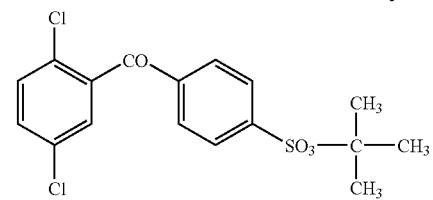

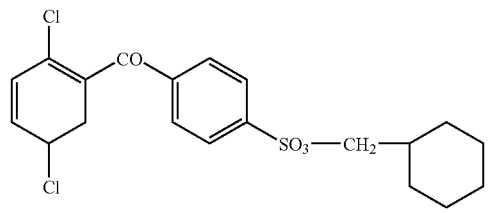

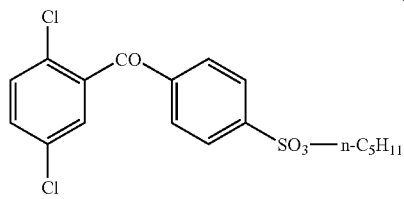

-continued
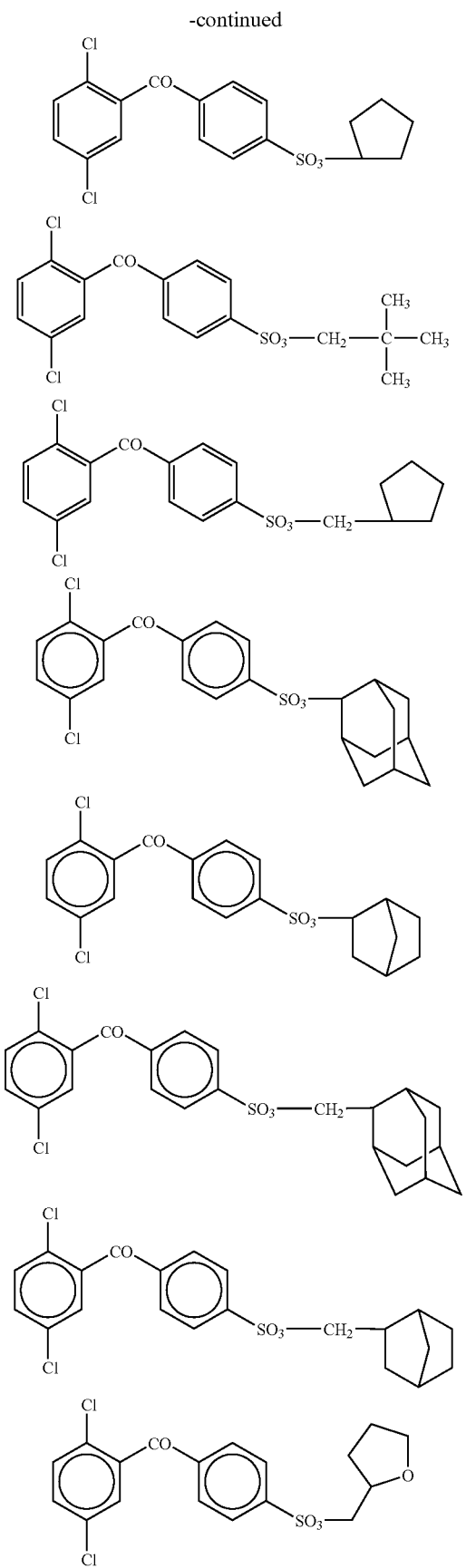
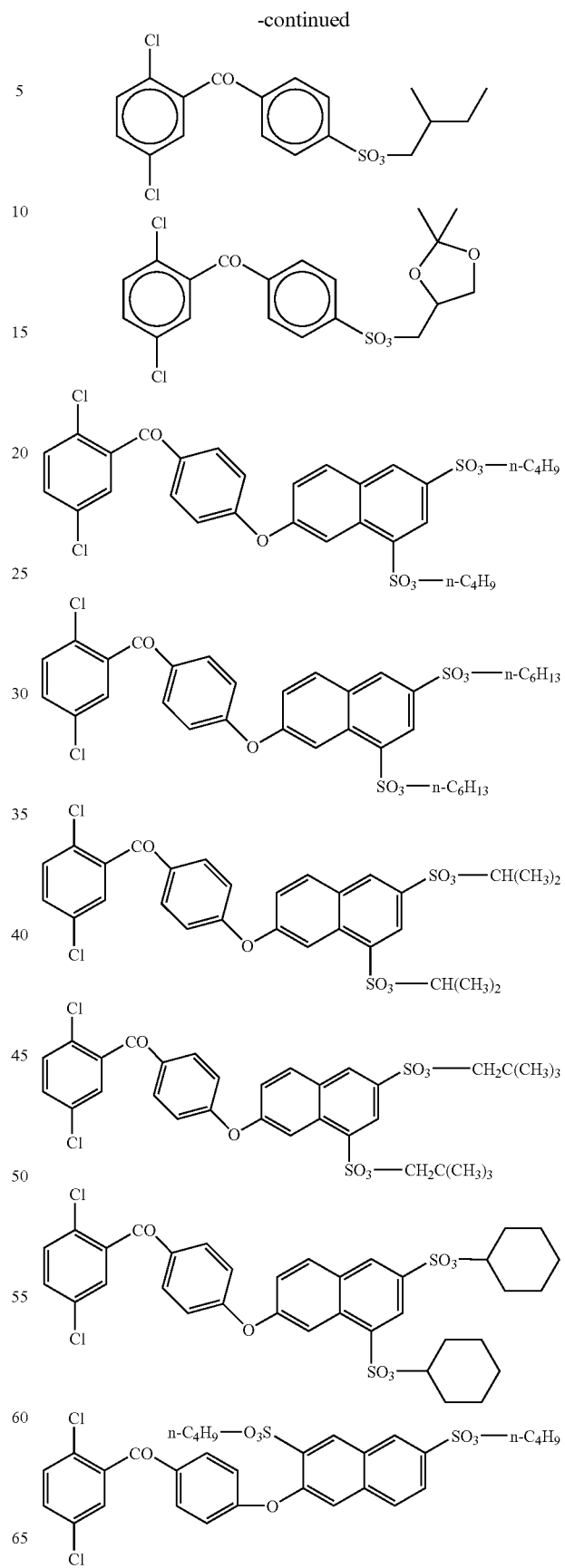

-continued
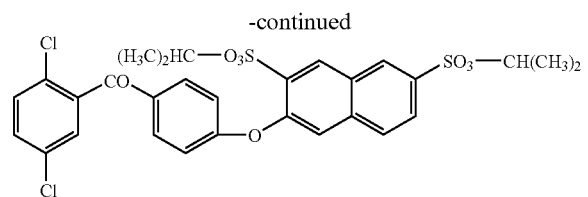
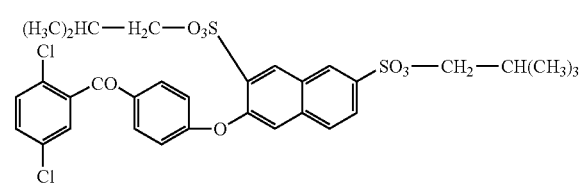
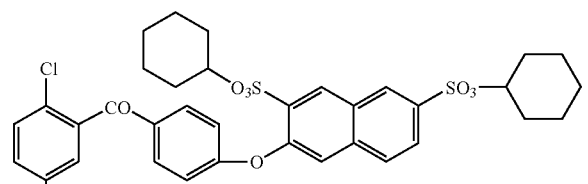
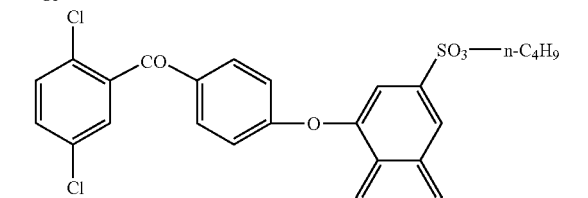
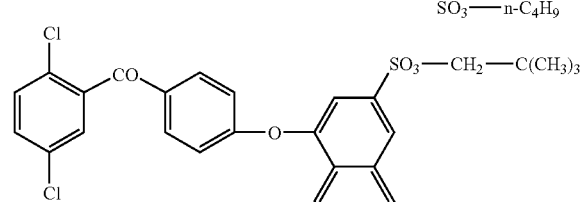
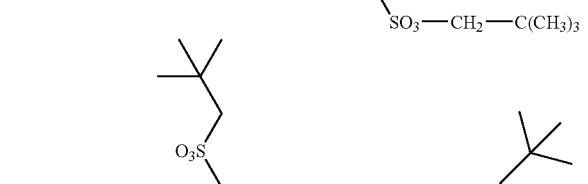
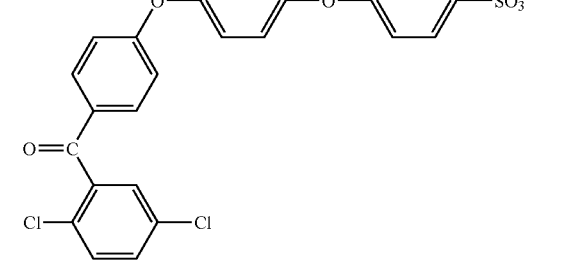
-continued
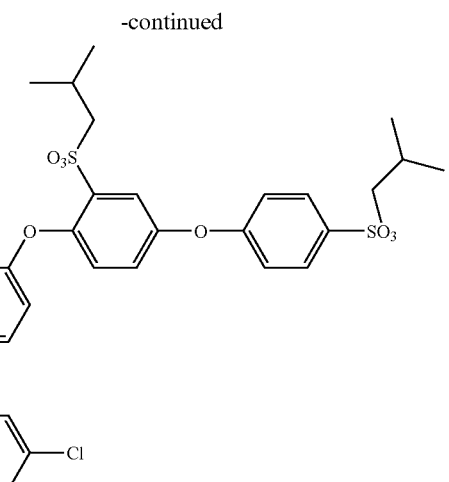
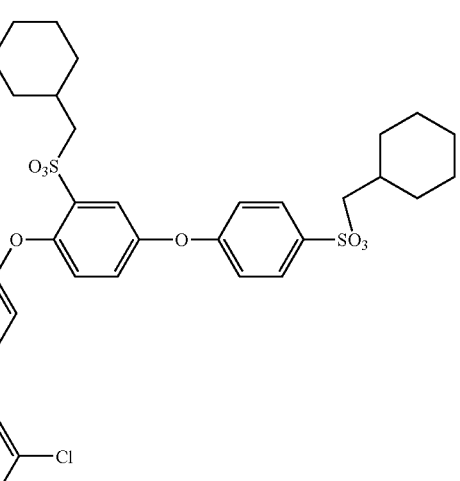
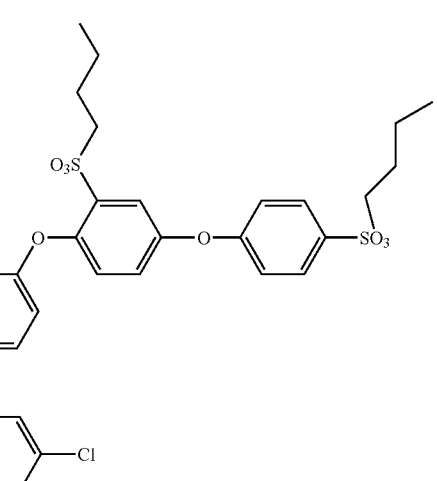

-continued
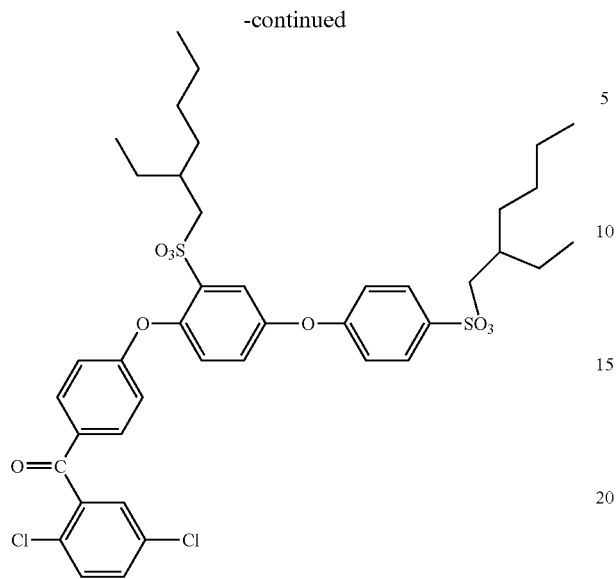
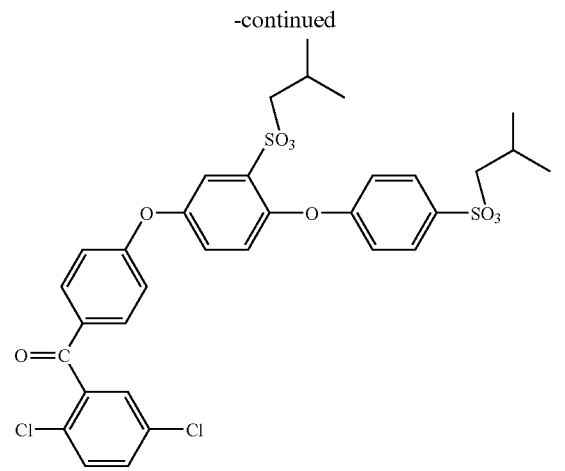
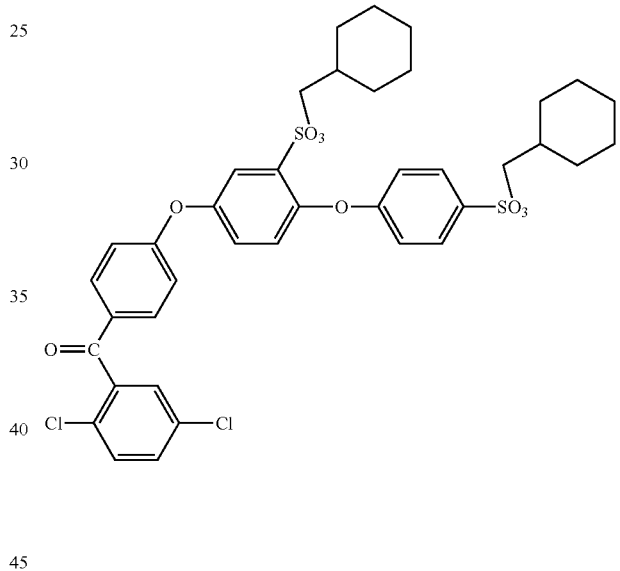
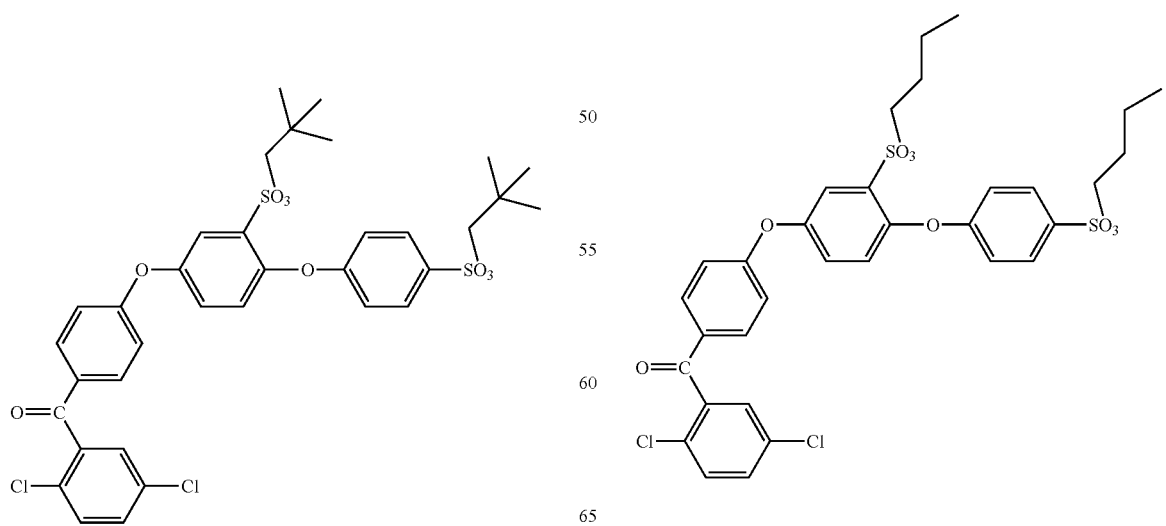

-continued
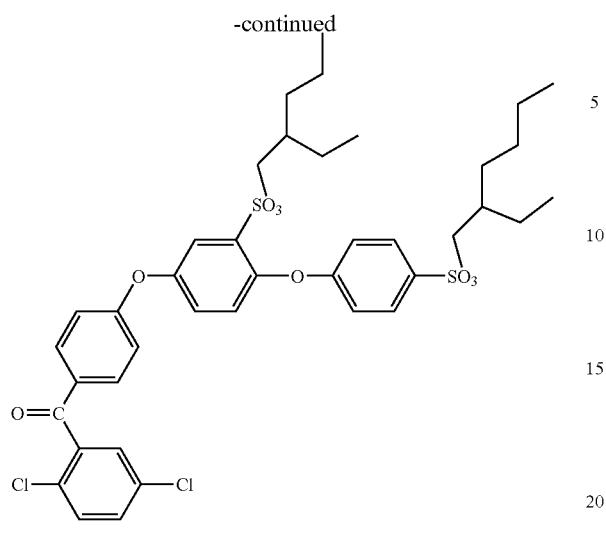
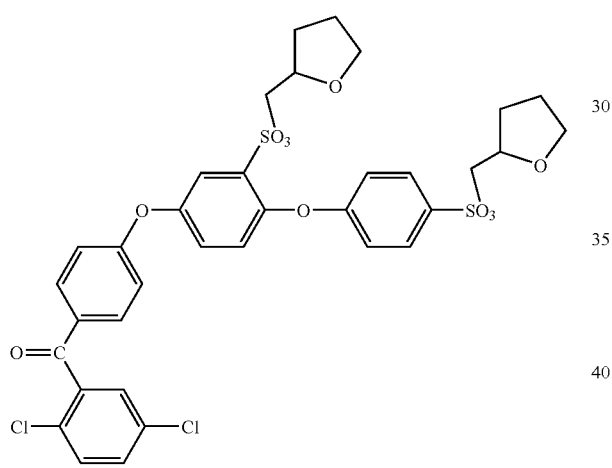
-continued
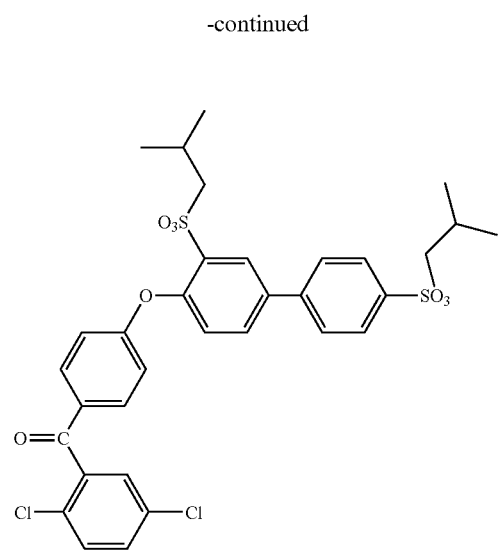
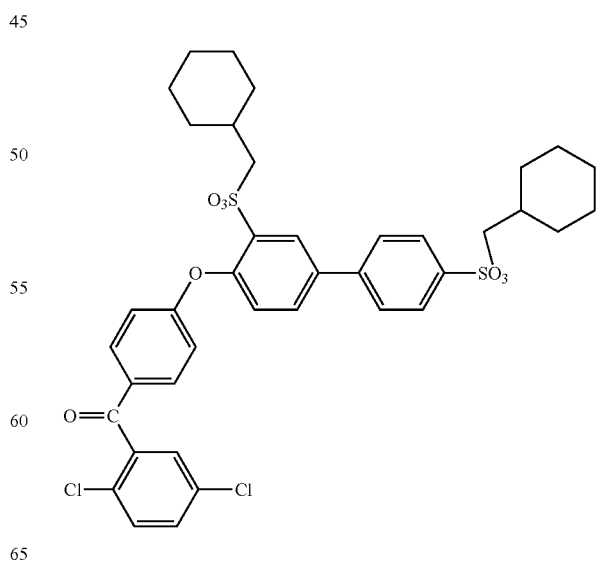

-continued
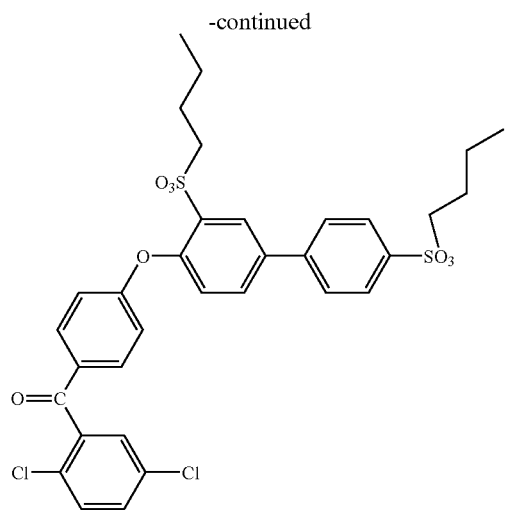
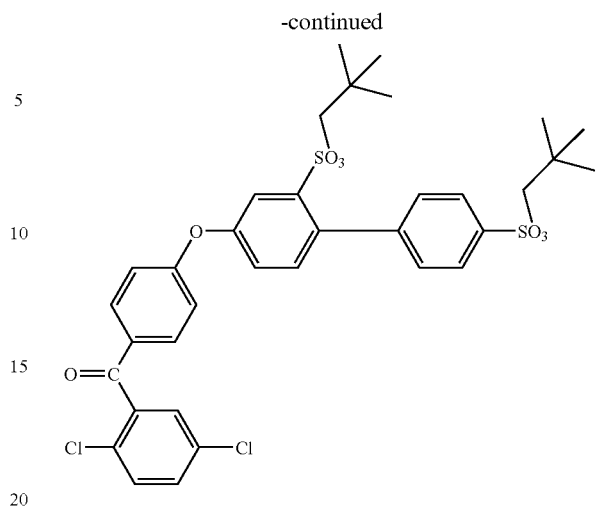
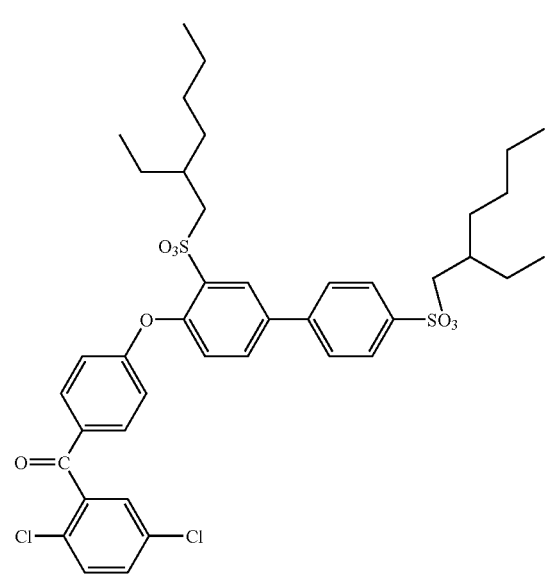
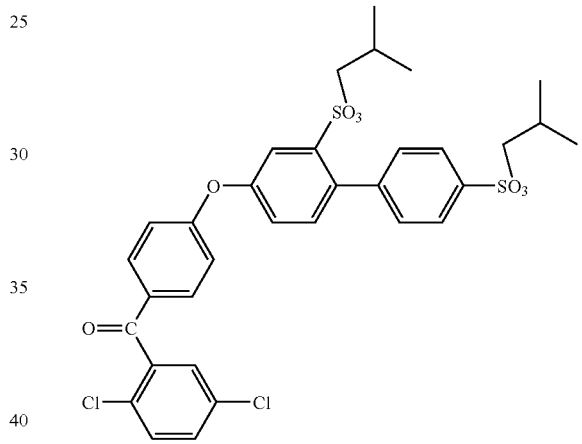
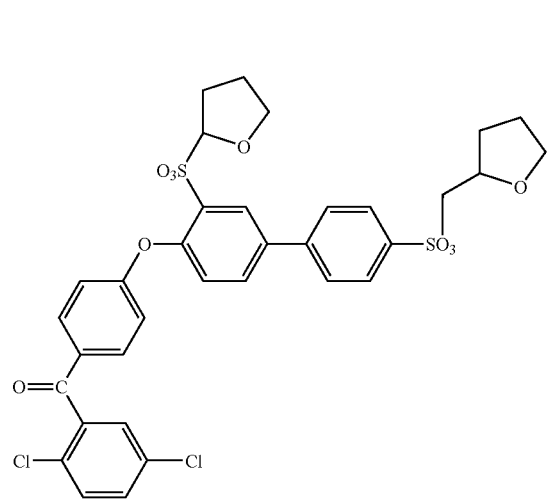
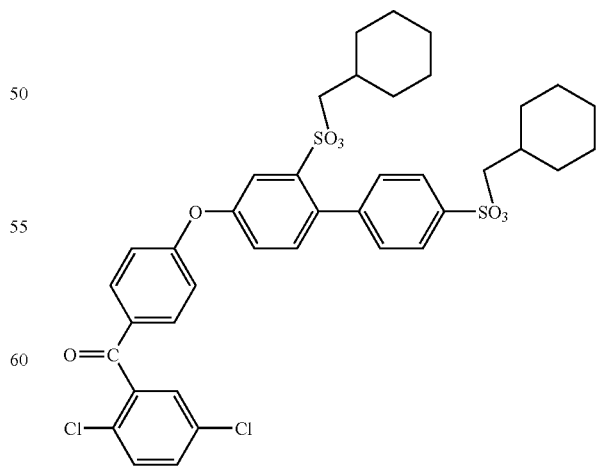

-continued

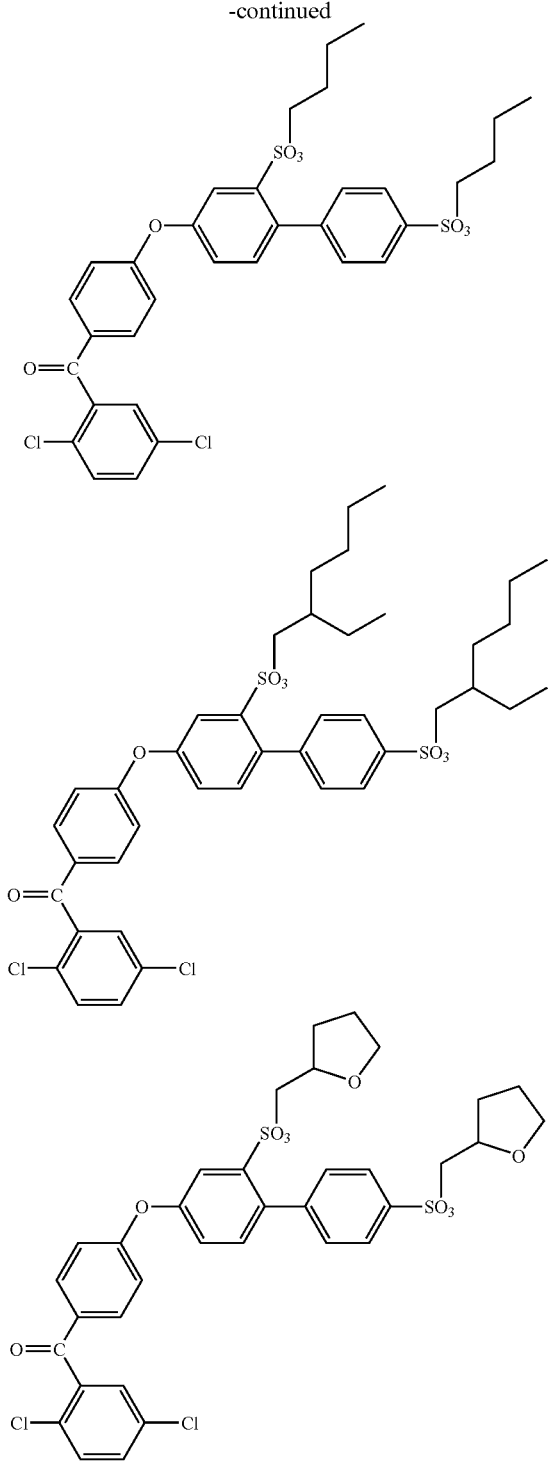

Examples of the sulfonate represented by the formula (D) may include compounds obtainable by replacing chlorine atom with bromine atom in the above compounds, compounds obtainable by replacing —CO— with —SO$_2$— in the above compounds, and compounds obtainable by replacing chlorine atom with bromine atom and —CO— with —SO$_2$— in the above compounds.

In the formula (D), it is preferred that the R$^b$ group be derived from primary alcohol and β carbon be tertiary or quaternary carbon in the viewpoint that the stability is excellent during polymerization and polymerization inhibition or crosslinking resulted by the generation of sulfonic acid caused by de-esterification is not induced. Furthermore, it is preferred that these ester groups be derived from primary alcohol and the β-position be quaternary carbon.

Examples of the compounds having the same skeleton as the sulfonate represented by the formula (D) and having no sulfonic group and no sulfonate group may include the following compounds.

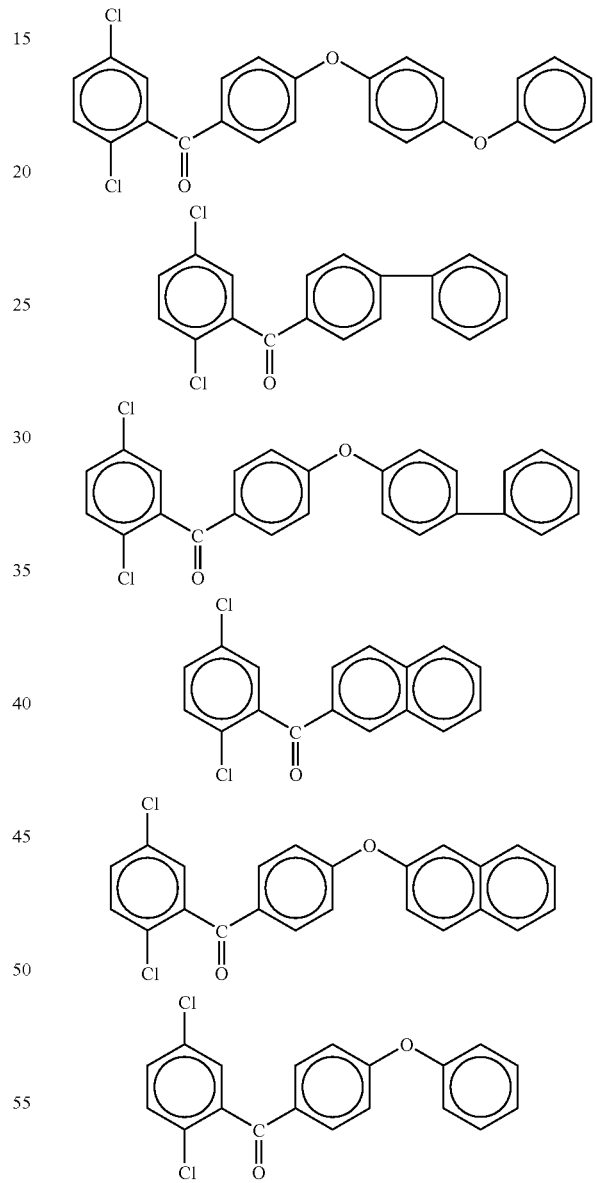

Examples of the compound further may include compounds obtainable by replacing chlorine atom with bromine atom in the above compounds, compounds obtainable by replacing —CO— with —SO$_2$— in the above compounds, and compounds obtainable by replacing chlorine atom with bromine atom and —CO— with —SO$_2$— in the above compounds.

Examples of the oligomer capable of being the structural unit of the formula (B) may include compounds represented by the following formula (E) (hereinafter referred to "Oligomer (E)").

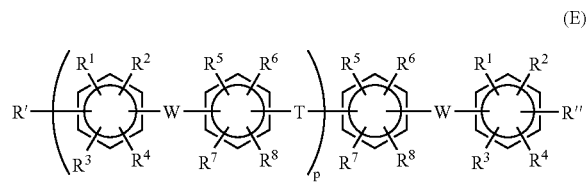

In the formula (E), $R^1$ to $R^8$, W, T and p are respectively synonymous with $R^1$ to $R^8$, W, T and p in the formula (B).

R' and R" may be the same or different each other and are a halogen atom excluding fluorine atom or a group represented by —$OSO_2Z$ wherein Z is an alkyl group, fluorine-substituted alkyl group or aryl group. Examples of the alkyl group of Z may include methyl group, ethyl group and the like. Examples of the fluorine-substituted alkyl group of Z may include trifluoromethyl group and the like. Examples of the aryl group of Z may include phenyl group, p-tolyl group and the like.

Examples of the compounds represented by the formula (E) in the case that p=0 may include 4,4'-dichlorobenzophenone, 4,4'-dichlorobenzoanilide, bis(chlorophenyl)difluoromethane, 2,2-bis(4-chlorophenyl)hexafluoropropane, 4-chlorobenzoic acid-4-chlorophenyl, bis(4-chlorophenyl) sulfoxide, bis(4-chlorophenyl)sulfone, 2,6-dichlorobenzonitrile and 9,9-bis(4-hydroxyphenyl)fluorene. Further examples thereof may include compounds obtainable by replacing chlorine atom with bromine atom or iodine atom in these compounds, and compounds obtainable by replacing at least one halogen atom substituted present at the 4-position to at the 3-position.

Examples of the compounds represented by the formula (E) in the case that p=1 may include 4,4'-bis(4-chlorobenzoyl) diphenylether, 4,4'-bis(4-chlorobenzoylamino)diphenylether, 4,4'-bis(4-chlorophenylsulfonyl)diphenylether, 4,4'-bis(4-chlorophenyl)diphenylether dicarboxylate, 4,4'-bis[(4-chlorophenyl)-1,1,1,3,3,3-hexafluoropropyl] diphenylether, 4,4'-bis[(4-chlorophenyl)tetrafluoroethyl] diphenylether, compounds obtainable by replacing chlorine atom with bromine atom or iodine atom in these compounds, compounds obtainable by replacing a halogen atom present at the 4-position to at the 3-position and compounds obtainable by replacing at least one diphenyl ethers present at the 4 position to at the 3-position.

Examples of the compounds represented by the formula (E) may include 2,2-bis[4-{4-(4-chlorobenzoyl) phenoxy}phenyl]-1,1,1,3,3,3-hexafluoropropane, bis[4-{4-(4-chlorobenzoyl) phenoxy}phenyl]sulfone and the compounds represented by the following formulas.

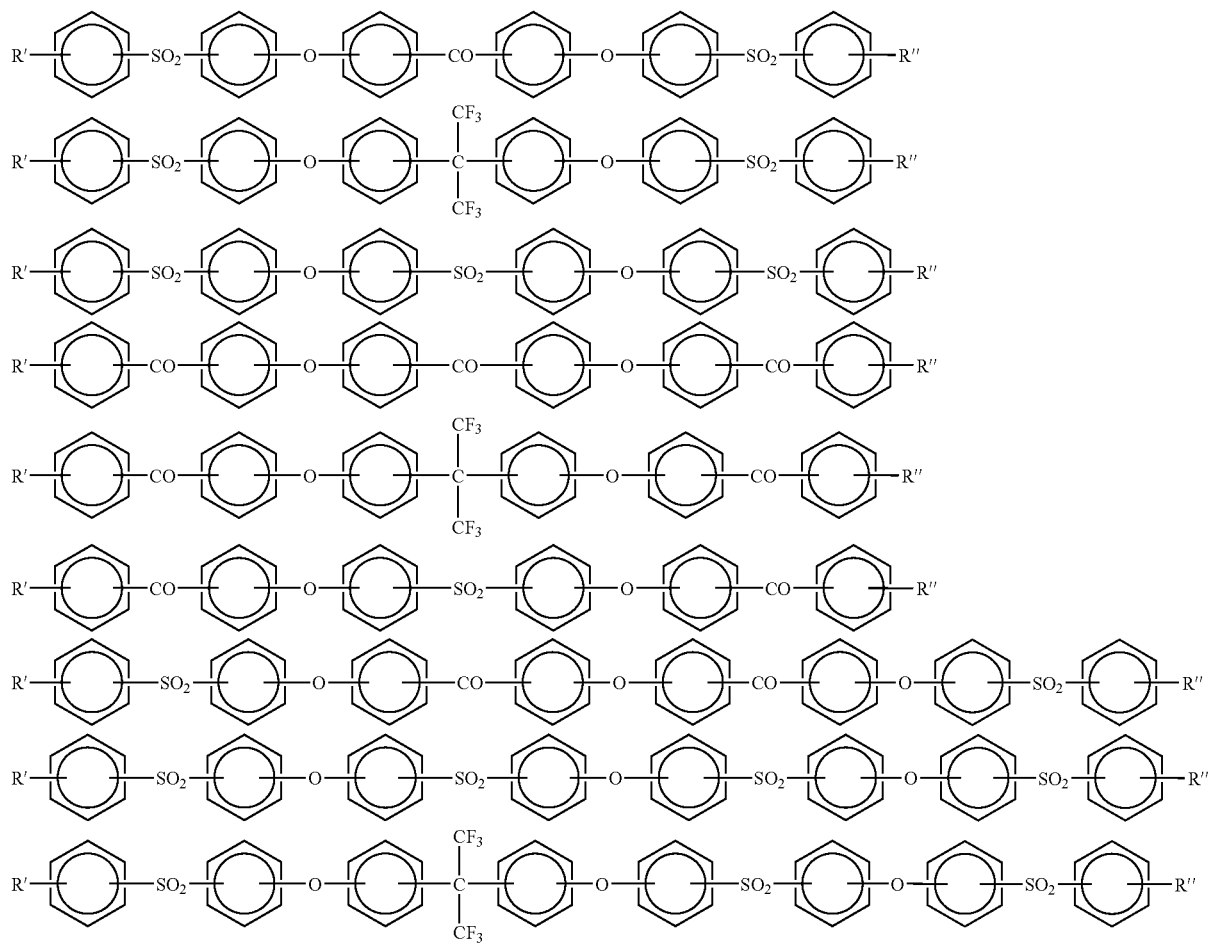

-continued

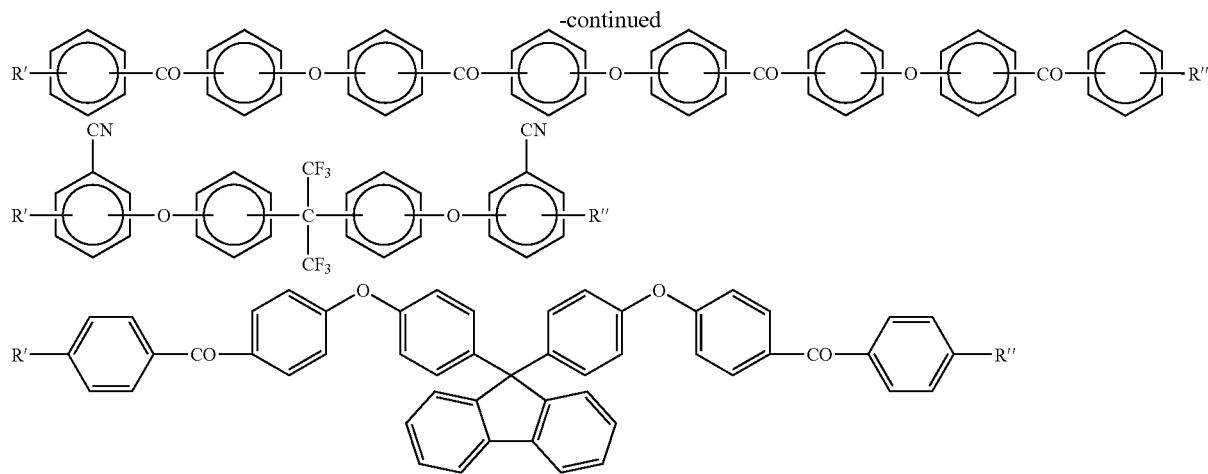

The compound represented by the formula (E) can be synthesized by, for example, the following method.

In order to make a bisphenyl connected with an electron-withdrawing group to an alkali metal salt of a corresponding bisphenyl, the addition of an alkali metal such as lithium, sodium, potassium and the like, a hydrogenated alkali metal, an alkali metal hydroxide or an alkali metal carbonate is carried out in a polar solvent having a high dielectric constant such as N-methyl-2-pyrrolidone, N,N-dimethylacetoamide, sulfolane, diphenylsulfone, dimethyl sulfoxide and the like.

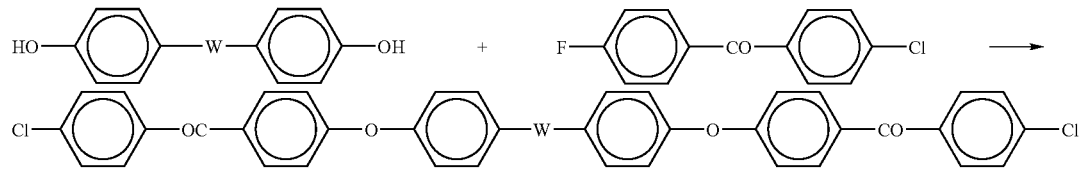

Usually, the alkali metal is submitted to reaction in an excess amount based on hydroxyl group of phenyl, and is used in an amount of from 1.1 to 2 times by equivalent weight, preferably 1.2 to 1.5 times by equivalent weight. In this reaction, an aromatic dihalide compound substituted with a halogen atom such as fluorine, chlorine or the like which compound is activated with an electron-withdrawing group, is submitted to reaction in the presence of a solvent azeotropic with water, such as benzene, toluene, xylene, hexane, cyclohexane, octane, chlorobenzene, dioxane, tetrahydrofuran, anisole or phenetole. Examples of the aromatic dihalide compound may include 4,4'-difluorobenzophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenyl sulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone or 1,3-bis(4-chlorobenzoyl)benzene.

From the viewpoint of the reactivity, a fluorine compound is preferred. In consideration of the following aromatic coupling reaction, it is necessary to conduct the aromatic nucleophilic substitution reaction so that the terminal end should be a chlorine atom. The active aromatic dihalide is used in an amount of from 2 to 4 times by mol, preferably 2.2 to 2.8 times by mol based on bisphenyl. The reaction temperature is from 60 to 300° C., preferably 80 to 250° C. The reaction time is from 15 min to 100 hr, preferably 1 hr to 24 hr.

In the process, it is most preferred to use chlorofluoro compounds having two halogen atoms different in reactivity from each other as an active aromatic dihalide represented by the following formulas. It is convenient to prepare an objective activated end chloro compound because fluorine atom preferentially undergo the nucleophilic substitution reaction with phenoxide.

wherein W is as defined in the formula (B).

Alternatively, the nucleophilic substitution reaction may be carried out in combination with electrophilic substitution reaction to synthesize an objective flexible compound comprising the electron-withdrawing and electron-donating groups, as described in JP-A-H02 (1990)-159.

Specifically, the aromatic bishalide activated with the electro-withdrawing group, for example, bis(4-chlorophenyl)sulfone is subjected to nucleophilic substitution reaction with phenyl to prepare a bisphenoxy substitution product. Then, this bisphenoxy substitution product is subjected to Friedel-Crafts reaction with, for example, 4-chlorobenzoic acid chloride to prepare an objective compound.

The aromatic bishalide activated with the electron-withdrawing group used herein may include the above-exemplified compounds. Although phenyl may be substituted, it is preferably non-substituted from the viewpoint of the heat resistance and flexibility. For the phenyl substitution reaction, phenyl is preferred to be an alkali metal salt thereof. The above-mentioned compounds may be used as the alkali metal compound. The alkali metal compound is used in an amount of from 1.2 to 2 times by mol based on 1 mol of phenyl. In the reaction, it is possible to use the above-mentioned polar solvent or azeotropic solvent with water.

The Friedel-Crafts reaction between the bisphenoxy compound and the acylating agent such as chlorobenzoic acid chloride is preferably carried out in the presence of an activator for the Friedel-Crafts reaction, such as aluminum chloride, boron trifluoride or zinc chloride. The chlorobenzoic acid chloride is used in an amount of from 2 to 4 times by mol, preferably 2.2 to 3 times by mol based on the bisphenoxy compound. The activator for the Friedel-Crafts reaction is used in an amount of from 1.1 to 2 times by equivalent weight based on 1 mol of the active halide compound such as chlorobenzoic acid which is the acylating agent. The reaction time is from 15 min to 10 hr. The reaction temperature is from −20° C. to 80° C. The solvent used herein may include chlorobenzene, nitrobenzene and the like which are inert to the Friedel-Crafts reaction.

The compound of the formula (E) in which p is 2 or more can be prepared by the substitution reaction of a bisphenyl alkali metal salt with an excess amount of the activated aromatic halogen compound in the presence of a polar solvent such as N-methyl-2-pyrrolidone, N,N-dimethylacetoamide or sulfolane in accordance with the above monomer synthesis procedure. In this case, the bisphenyl is a compound which can supply ether oxygen as the electron-donating group T and at least one group selected from $>C=O$, $-SO_2-$ and $>C(CF_3)_2$ as the electron-withdrawing groups W in the formula (E). Examples of the bisphenyl may include 2,2-bis(4-hydroxyphenyl)-1,1,1,3,3,3-hexafluoropropane, 2,2-bis(4-hydroxyphenyl)ketone, 2,2-bis(4-hydroxyphenyl) sulfone, etc. Examples of the activated aromatic halogen compound may include 4,4-dichlorobenzophenone, bis(4-chlorophenyl) sulfone, etc.

As the compounds, the following compounds may be exemplified.

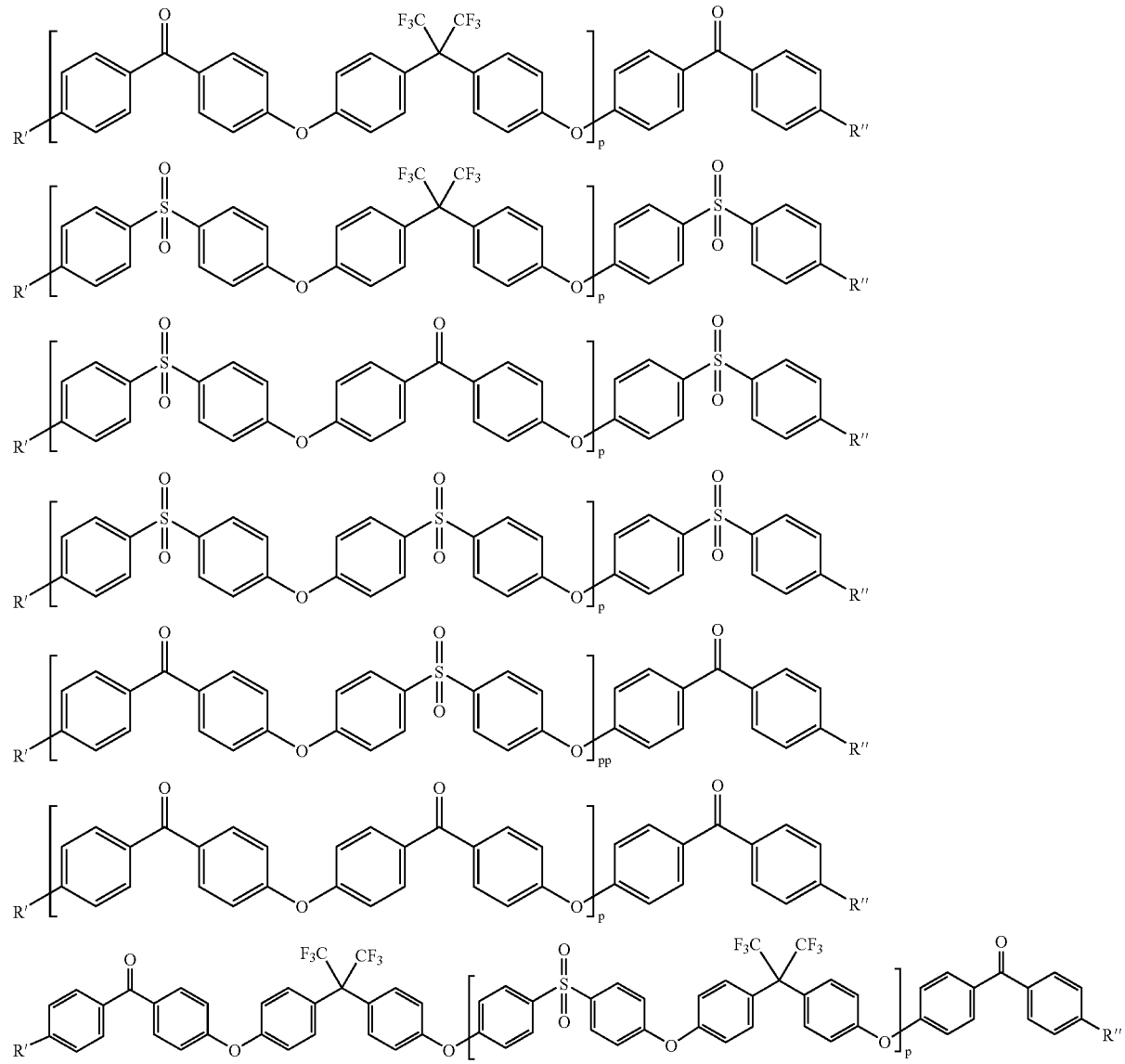

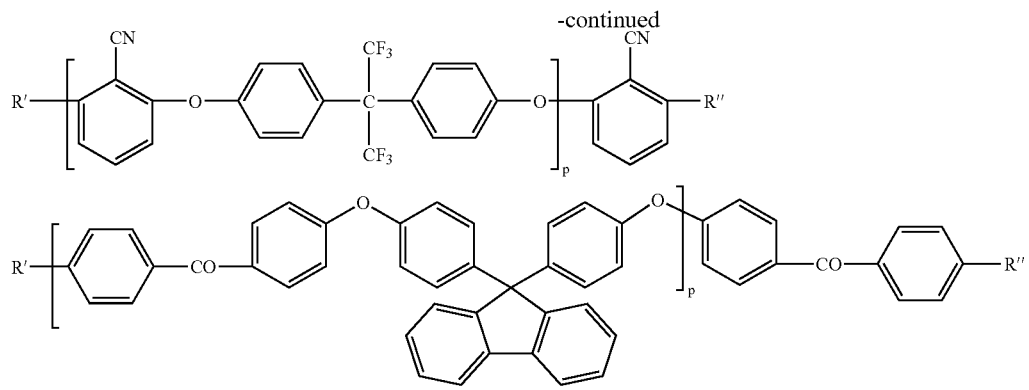

The polyarylene having a sulfonate group is synthesized by allowing the monomer (D) to react with optionally the oligomer (E) in the presence of a catalyst. The catalyst used herein is a catalyst system containing a transition metal compound. This catalyst system essentially contains (i) a transition metal salt and a compound which functions as a ligand (referred to as the "ligand component" hereinafter), or a transition metal complex (including a copper salt) to which ligands are coordinated, and (ii) a reducing agent. A "salt" may be added to increase the polymerization rate.

Examples of the transition metal salt may include nickel compounds such as nickel chloride, nickel bromide, nickel iodide or nickel acetylacetonate; palladium compounds such as palladium chloride, palladium bromide or palladium iodide; iron compounds such as iron chloride, iron bromide or iron iodide; and cobalt compounds such as cobalt chloride, cobalt bromide or cobalt iodide. Of these, nickel chloride and nickel bromide are particularly preferred.

Examples of the ligand component may include triphenyl phosphine, 2,2'-bipeyridine, 1,5-cyclooctadiene, 1,3-bis (diphenylphosphino)propane and the like. Of these, triphenyl phosphine and 2,2'-bipyridine are preferred. The compounds used as the ligand components may be used singly or in combination with two or more.

Examples of the transition metal complex with coordinated ligands may include nickel chloride bis(triphenyl phosphine), nickel bromide bis(triphenyl phosphine), nickel iodide bis (triphenyl phosphine), nickel nitride bis(triphenyl phosphine), nickel chloride (2,2'-bipyridine), nickel bromide (2,2'-bipyridine), nickel iodide (2,2'-bipyridine), nickel nitride (2,2'-bipyridine), bis(1,5-cyclooctadiene)nickel, tetrakis(triphenylphosphine)nickel, tetrakis(triphenylphosphito)nickel, tetrakis(triphenylphosphine)nickel, tetrakis (triphenylphosphine)paradium and the like. Of these nickel chloride bis(triphenylphosphine) and nickel chloride(2,2'-bipyridine) are preferred.

Examples of the reducing agent capable of being used in the above catalyst system may include iron, zinc, manganese, aluminum, magnesium, sodium, calcium and the like. Of these, zinc, magnesium and manganese are preferred. These reducing agents are more activated by contact with an acid such as an organic acid and the like and then submitted to use.

Examples the salt used in the above catalyst system may include sodium compounds such as sodium fluoride, sodium chloride, sodium bromide, sodium iodide or sodium sulfate; potassium compounds such as potassium fluoride, potassium chloride, potassium bromide, potassium iodide or potassium sulfate; ammonium compounds such as tetraethyl ammonium fluoride, tetraethyl ammonium chloride, tetraethyl ammonium bromide, tetraethyl ammonium iodide or tetraethyl ammonium sulfate. Of these, sodium bromide, sodium iodide, potassium bromide, tetraethyl ammonium bromide and tetraethyl ammonium iodide are preferred.

With regard to the amount of each component used herein, the transition metal salt or the transition metal complex is used in an amount of usually from 0.0001 to 10 mol, preferably 0.01 to 0.5 mol, based on 1 mol of the total of the above monomers (the total of the monomer (D) and the oligomer (E), referred to hereinafter). When the amount is less than 0.0001 mol, the polymerization reaction is not sometimes carried out sufficiently, while when the amount is over 10 mol, the molecular weight sometimes lowers.

In the case of using the transition metal salt and the ligand component in the catalyst system, the ligand component is used in an amount of usually from 0.1 to 100 mol, preferably 1 to 10 mol based on 1 mol of the transition metal salt. When the amount of the ligand component is less than 0.1 mol, the catalyst activity is sometimes insufficient, while when the amount is over 100 mol, the molecular weight sometimes lowers.

The reducing agent is used in an amount of usually from 0.1 to 100 mol, preferably 1 to 10 mo based on 1 mol of the total of the above monomers. When the amount of the reducing agent is less than 0.1 mol, the polymerization is not sometimes carried out sufficiently, while the amount is over 100 mol, it is sometimes difficult to purify the resulting polymer.

Furthermore, in the case of using the salt, the salt is used in an amount of usually from 0.001 mol to 100 mol, preferably 0.01 to 1 mol, based on 1 mol of the total of the above monomers. When the amount of the salt is less than 0.001 mol, it is sometimes insufficient to increase the polymerization rate, while when the amount is over 100 mol, it is sometimes difficult to purify the resulting polymer.

Examples of the polymerization solvent used in the reaction of the monomer (D) with optionally the oligomer (E) may include tetrahydrofuran, cyclohexanone, dimethyl sulfoxide, N,N-dimethyl formamide, N,N-dimethylacetoamide, N-methyl-2-pyrrolidone, γ-butyrolactone, N,N'-dimethyl imidazolidinone and the like. Of these, tetrahydrofuran, N,N-dimethyl formamide, N,N-dimethyl acetoamide, N-methyl-2-pyrrolidone and N,N'-dimethylimidazolidinone are preferred. These polymerization solvents are preferably dried sufficiently and then submitted to use.

The concentration of all the monomers combined in the polymerization solvent is usually from 1 to 90% by weight, preferably 5 to 40% by weight.

In the polymerization, the polymerization temperature is usually from 0 to 200° C., preferably 50 to 120°. The polymerization time is usually from 0.5 to 100 hr, preferably 1 to 40 hr.

The polyarylene having a sulfonate group prepared by using the monomer (D) can be formed into a polyarylene having a sulfonic group by transforming into a sulfonic group with hydrolysis of a sulfonate group.

Examples of the hydrolysis method may include:

(1) a method of introducing the polyarylene having the sulfonate group into an excess amount of water or alcohol containing a small amount of hydrochloric acid and stirring for 5 min or more, (2) a method of subjecting the polyarylene having the sulfonate group to reaction in trifluoro acetic acid at a temperature of about from 80 to 120° C. for about 5 to 10 hr, and (3) a method of subjecting the polyarylene having the sulfonate group to reaction in a solution containing 1 to 3 times by mol of lithium bromide based on 1 mol of sulfonate group ($—SO_3R$) in the polyarylene at a temperature of about from 80 to 150° C. for about 3 to 10 hr and thereafter adding hydrochloric acid.

The polyarylene having a sulfonic group may be prepared in such a way that the monomer having the skeleton same as the sulfonate of the formula (D) and having no a sulfonate group is previously (co)polymerized with optionally the oligomer represented by the formula (E) to prepare a polyarylene having no sulfonic group and then the polyarylene having no sulfonic group is sulfonated. In this case, after the polyarylene having no sulfonic group is prepared in accordance with the above procedure, a sulfonic group is introduced into the polyarylene having no sulfonic group using a sulfonation agent to prepare the polyarylene having a sulfonic group.

The sulfonation of the polyarylene having no sulfonic group can be carried out by introducing a sulfonic group into the polyarylene having no sulfonic group using the sulfonation agent in the absence or presence of a solvent in accordance with the ordinary method.

In the method of introducing a sulfonic group, the polyarylene having no sulfonic group can be sulfonated using a known sulfonation agent such as sulfuric anhydride, fuming sulfuric acid, chlorosulfonic acid, sulfuric acid or sodium hydrogen sulfite in known conditions [as disclosed in Polymer Preprints, Japan, Vol.42, No. 3, p. 730(1993); Polymer Preprints, Japan, Vol.43, No. 3, p. 736(1994); and Polymer Preprints, Japan, Vol.42, No. 7, pp. 2490-2492(1993)].

Namely, the polyarylene having no sulfonic group is allowed to react with the sulfonation agent in the absence or presence of a solvent in the following reaction conditions. Examples of the solvent may include a hydrocarbon solvent such as n-hexane etc; an ether solvent such as tetrahydrofuran, dioxane, etc; a non-proton polar solvent such as dimethyl acetoamide, dimethylformamide, dimethylsulfoxide, etc; and further a halogenated hydrocarbon such as tetrachloroethane, dichloroethane, chloroform, methylene chloride, etc. The reaction temperature, which is not particularly limited, is usually from −50 to 200° C., preferably −10 to 100° C. The reaction time is usually from 0.5 to 1000 hr, preferably 1 to 200 hr.

The amount of the sulfonic group in the polyarylene (C) having a sulfonic group prepared by the above method is usually 0.3 to 5 meq/g, preferably 0.5 to 3 meq/g, more preferably 0.8 to 2.8 meq/g. When the amount is less than 0.3 meq/g, the proton conductivity is low so that it unpractical. The amount is undesirably over 5 meq/g, because the water resistance is markedly lowered.

The amount of the sulfonic group can be regulated by changing the kinds of the monomer (D) and the oligomer (E), the proportion thereof and the combination.

The polyarylene having a sulfonic group has a weight-average molecular weight of 10,000 to 1,000,000, and preferably 20,000 to 800,000, as measured by gel permeation chromatography (GPC) in terms of polystyrene.

The polyarylene having a sulfonic group may contain an antioxidant, preferably a hindered phenyl compound having a molecular weight of at least 500 and then submitted to use. The polyarylene having a sulfonic group contains the antioxidant so that the durability thereof as an electrolyte can be improved.

Examples of the hindered phenyl compound used in the present invention may include: triethyleneglycol-bis[3-(3-t-butyl-5-methyl-4-hydroxyphenyl)propionate] (Trade Name: IRGANOX 245), 1,6-hexanediol-bis[3-(3,5-di-t-butyl-4-hydroxyphenyl) propionate] (Trade Name: IRGANOX 259), 2,4-bis-(n-octylthio)-6-(4-hydroxy-3,5-di-t-butylanilino)-3, 5-triadine (Trade Name: IRGANOX 565), pentaerythrityl-tetrakis[3-(3,5-di-t-butyl-4-hydroxyphenyl) propionate] (Trade Name: IRGANOX 1010), 2,2-thio-diethylenebis[3-(3,5-di-t-butyl-4-hydroxyphenyl) propionate] (Trade Name: IRGANOX 1035), octadecyl-3-(3,5-di-t-butyl-4-hydroxyphenyl)propionate (Trade Name: IRGANOX 1076), N,N-hexamethylene bis(3,5-di-t-butyl-4-hydroxy-hydrocinnamide (Trade Name: IRGANOX 1098), 1,3,5-trimethyl-2,4,6-tris(3,5-di-t-butyl-4-hydroxybenzyl) benzene (Trade Name: IRGANOX 1330), tris-(3,5-di-t-butyl-4-hydroxybenzyl)isocyanurate (Trade Name: IRGANOX 3114) and 3,9-bis[2-[3-(3-t-butyl-4-hydroxy-5-methylphenyl) propionyloxy]-1,1-dimethylethyl]-2,4,8,10-tetraoxaspiro [5,5]undecane (Trade Name: Sumilizer GA-80).

In the present invention, the hindered phenyl compound is preferably used in an amount of from 0.01 to 10 parts by weight based on 100 parts by weight of the polyarylene having a sulfonic group.

(Composition)

The proton conductive composition of the present invention comprises the polyarylene having a sulfonic group as described above and the metal catalyst, and further optionally the metal oxide.

The proton conductive composition of the present invention contains the metal catalyst in an amount of from 0.01 to 80 parts by weight, preferably 0.1 to 50 parts by weight, more preferably 1 to 40 parts by weight based on 100 parts by weight of the polyarylene having a sulfonic group.

In the case that the proton conductive composition of the present invention contains the metal oxide fine particles and/or the metal oxide fibers, the metal oxide fine particles and the metal oxide fiber are contained in a total amount of from 0.01 to 50 parts by weight, preferably 0.1 to 30 parts by weight, more preferably 1 to 20 parts by weight based on 100 parts by weight of the polyarylene having a sulfonic group.

The proton conductive composition of the present invention can be prepared by, for example, blending the above components in a predetermined proportion, mixing them with a known method using a mixer capable of applying a high shear force such as homogenizer, disperser, paint conditioner, ball mill and the like. In this preparation, a solvent may be used. Examples of the solvent used herein may include the solvents same as used in the following casting method.

(Proton Conductive Membrane)

The proton conductive membrane of the present invention comprises the polyarylene having a sulfonic group, at least one metal catalyst selected from the group consisting of platinum, gold, palladium, rhodium, iridium and ruthenium, and optionally the metal oxide fine particles and/or metal oxide fibers. The proton conductive membrane contains the metal catalyst in an amount of from 0.01 to 80 parts by weight, preferably 0.1 to 50 parts by weight, more preferably 1 to 30 parts by weight based on 100 parts by weight of the polyarylene having a sulfonic group. In the case that the proton conductive membrane contains the metal oxide fine particles and/or the metal oxide fibers, it contains the metal oxide fine particles and/or the metal oxide fiber in a total amount of 0.01 to 50 parts by weight, preferably 0.1 to 30 parts by weight, more preferably 1 to 20 parts by weight based on 100 parts by weight of the polyarylene having a sulfonic group.

The proton conductive membrane of the present invention can be prepared by, for example, forming the proton conductive composition into a film.

The proton conductive membrane of the present invention may contain an inorganic acid such as sulfuric acid, phosphoric acid and the like, an organic acid including carboxylic acid, and an appropriate amount of water in addition to the metal catalyst, the metal oxide and the polyarylene having a sulfonic group.

The film preparation using the proton conductive composition of the present invention can be carried out by a casting method such that the composition is subjected to film casting on a substrate and thereby molded into a film.

Particularly non-limiting examples of the solvent used in the casting method may include non-proton polar solvents such as γ-butyrolactone, dimethyl acetoamide, dimethyl formamide, N-methyl-2-pyrrolidone, dimethyl sulfoxide, dimethyl urea and the like. These solvents may be mixed with an alcohol solvent such as methanol, ethanol, n-propylalcohol, iso-propyl alcohol, 1-methoxy-2-propanol and the like.

The polymer concentration of the proton conductive composition depends on the molecular weight of the polyarylene having a sulfonic group, and is usually from 5 to 40% by weight, preferably 7 to 25% by weight. When the polymer concentration is less than 5% by weight, it is difficult to form a thick film and pinholes are easily generated. When it is over 40% by weight, it is difficult to form a film because the solution viscosity is too high, and the resulting film optionally has inferior surface smoothness.

The solution viscosity of the proton conductive composition, which depends on the molecular weight of the polyarylene or the polymer concentration, is usually from 2,000 to 100,000 mPa·s, preferably 3,000 to 50,000 mPa·s. When the solution viscosity is less than 2,000 mPa·s, the solution has inferior retention properties during the processing and thereby the solution sometimes overflows the substrate. When the solution viscosity is over 1000,000 mPa·s, the solution has a too high viscosity and thereby the extrusion from a die cannot be carried out and it is sometimes difficult to conduct film formation with a film casting method.

Non limiting examples of the substrate may include polyethylene terephthalate (PET) films and the like, and further may include any materials which can be used as a substrate usually submitted to the solution casting method, for example, plastic materials and metal materials.

After the film formation with the casting method, the proton conductive composition film is dried at a temperature of from 30 to 160° C., preferably 50 to 150° C., for a period of time of from 3 to 180 min, preferably 5 to 120 min to prepare a membrane (proton conductive membrane). The membrane has a dried film thickness of usually from 10 to 100 μm, preferably 20 to 80 μm. After the drying, when the solvent remains in the membrane, it is possible to remove the solvent with water extraction, if necessary.

Furthermore, the proton conductive membrane of the present invention can be also prepared by the following method. At first, a composition containing the metal oxide fine particles and/or the metal oxide fibers in a total amount of from 0.01 to 50 parts by weight, preferably 0.1 to 30 parts by weight, more preferably 1 to 20 parts by weight based on 100 parts by weight of the polyarylene having a sulfonic group is prepared and using this composition, a film is formed by the above method. Next, this film is immersed in pure water containing a complex such as platinum, gold, palladium, rhodium, iridium and ruthenium and thereby substituted and adsorbed and thereafter a metal complex is deposited in the film. Specifically, the method is carried out in the following manner.

In pure water containing a complex such as platinum, gold, palladium, rhodium, iridium and ruthenium in an amount of 2 to 50 times, preferably 5 to 30 times when 1 mol of the complex is exchanged per 2 mol of sulfonic acid in the film containing the metal oxide fine particles and/or the metal oxide fibers, the above proton conductive membrane containing the metal oxide fine particles and/or the metal oxide fibers is immersed, and replacement and adsorption thereof are carried out. Next, the membrane is washed with pure water for 4 hr or more, and put into a pure water containing hydrazine in an amount of equivalent weight to the complex such as platinum, gold, palladium, rhodium, iridium and ruthenium and immersed at a temperature of from 40 to 80° C. for 3 hr or more to deposit the complex in the solid electrolyte containing the metal oxide fine particles and/or the metal oxide fibers. Subsequently, the sulfonic group treated with hydrochloric acid having a 4 mol concentration is protonated, and then sufficiently washed with pure water and dried to prepare the proton conductive membrane of the present invention.

The proton conductive membrane of the present invention can be used for electrolytes such as primary battery, secondary battery, fuel cells and the like; ion exchange membranes such as halogenated hydroacid electrolysis, salt electrolysis and the like; various sensors such as humidity sensor, gas sensor and the like; water electrolysis; signal transmission mediums; solid condensers; display elements; oxygen concentrators and the like.

EXAMPLE

The present invention is described in more detail with reference to the following examples, but the present invention should be not limited by the examples.

In the examples, the sulfonic acid equivalent weight, molecular weight and proton conductivity were determined by the following manners.

1. Sulfonic Acid Equivalent Weight

The resulting polymer having a sulfonic group was washed until washing water became neutral and further sufficiently washed to remove acids remained freely. The polymer was dried and then a predetermined amount of the polymer was weighed and subjected to titration with a phenylphthalein dissolved in a THF/water mixed solvent as an indicator using a NaOH standard solution and the sulfonic acid equivalent weight was determined from the point of neutralization.

2. Measurement of Molecular Weight

The polyarylene having no sulfonic group was analyzed by GPC using a tetrahydrofuran (THF) solvent to measure the molecular weight in terms of polystyrene. The polyarylene having a sulfonic group was analyzed by GPC using a solvent consisted of N-methyl-2-pyrrolidone (NMP) mixed with lithium bromide and phosphoric acid, to measure the molecular weight in terms of polystyrene.

3. Preparation of Fuel Cells and Evaluation of Performance

A solid polymer electrolyte membrane was sandwiched with two electrode layers (Pt supporting amount 0.5 mg/cm$^2$) and they were hot pressed under a pressure of 40 kg/cm$^2$ at 160° C. for 15 min to prepare a membrane-electrode assembly. Next, the membrane electrode assembly was sandwiched with two titanium collectors and a heater was set outside thereof and thereby a fuel cell having an effective area of 25 cm$^2$ was assembled.

The temperature of the fuel cell was kept at 80° C., and the resistance of the cell was measured with feeding hydrogen and oxygen at 2 atm with or without humidification.

Synthesis Example 1

A 1-L three-necked flask equipped with a stirrer, a thermometer, a cooling tube, a Dean-stark tube and a three-way nitrogen inlet tube, was charged with 67.3 g (0.20 mol) of 2,2-bis(4-hydroxyphenyl)-1,1,1,3,3,3-hexafluoropropane (bisphenyl AF), 60.3 g (0.24 mol) of 4,4'-dichlorobenzophenone (4,4'-DCBP), 71.9 g (0.52 mol) of potassium carbonate, 300 ml of N,N-dimethylacetamide (DMAc) and 150 ml of toluene. With the flask in an oil bath, the contents were reacted by being stirred in a nitrogen atmosphere at 130° C. Reaction was carried out while the water resulting from the reaction was formed into an azeotropic mixture with toluene and was removed outside the system through the Dean-Stark tube. Water almost ceased to occur in about 3 hours, and most of the toluene was removed while gradually raising the reaction temperature from 130° C. to 150° C. After reaction had been made at 150° C. for 10 hours, 10.0 g (0.040 mol) of 4,4'-DCBP was added to carry out reaction for another 5 hours. Subsequently, the reaction liquid was cooled naturally and was filtered to remove precipitated by-product inorganic compounds. The filtrate was poured into 4 L of methanol to precipitate the product. The precipitated product was filtered off, dried and dissolved in 300 mL of tetrahydrofuran. The resultant solution was poured into 4 L of methanol to perform re-precipitation. Thus, 95 g of a desired compound was obtained (85% yield).

The resulting compound had a weight average molecular weight (Mw), as determined by GPC (THF solvent) in terms of polystyrene, of 11,200. The resulting compound was soluble in THF, NMP, DMAc and sulfolane, and had a Tg of 110° C. and a thermal decomposition temperature of 498° C.

The resulting compound was found to be an oligomer represented by the formula (I) (hereinafter referred to as "BCPAF oligomer").

with 39.58 g (98.64 mmol) of neo-pentyl 4-[4-(2,5-dichlorobenzoyl) phenoxy]benzenesulfonate (A-SO$_3$ neo-Pe), 15.23 g (1.36 mmol) of the BCPAF oligomer, 1.67 g (2.55 mmol) of Ni(PPh$_3$)$_2$Cl$_2$, 10.49 g (40 mmol) of PPh$_3$, 0.45 g (3 mmol) of NaI, 15.69 g (240 mmol) of zinc powder and 390 ml of dry NMP. Reaction was carried out by heating the system (finally to 75° C.) with stirring for 3 hours. The polymerization solution was diluted with 250 ml of THF, stirred for 30 minutes, and filtered with use of Celite as filter aid. The filtrate was poured into large excess (1500 ml) of methanol to precipitate the product. The precipitated product was filtered off, air dried, then redissolved in THF/NMP (200/300 ml) and precipitated in large excess (1500 ml) of methanol. The precipitated product was air dried and then heat dried to give 47.0 g (99% yield) of an objective yellow fibrous copolymer including a neopentyl-protected sulfonic acid derivative (Poly AB-SO$_3$neo-Pe). GPC provided a number-average molecular weight (Mn) of 47,600 and Mw of 159,000.

5.1 g of the PolyAB-SO$_3$neo-Pe thus prepared was dissolved in 60 mL of NMP and heated to 90° C. To the reaction system, a mixture of 50 mL of methanol and 8 mL of concentrated hydrochloric acid was added simultaneously. The reaction was carried out in a mild refluxing condition for 10 hr with keeping the suspension condition. A distillation apparatus was set, excess methanol was distilled off and a pale green transparent solution was prepared. This solution was poured into a large amount of water/methanol (1:1 weight ratio) and thereby the polymer was coagulated. Thereafter, the polymer was washed with ion exchange water until the pH of the washing solution was 6 or greater. The polymer thus prepared was determined quantitatively. From the IR spectrum and ion exchange capacity thereof, it was found that sulfonate group (—SO$_3$R$^a$) was quantitatively converted to sulfonic group (—SO$_3$H).

The resulting polyarylene copolymer having a sulfonic group had a molecular weight, as determined by GPC, such that Mn was 53,200 and Mw was 185,000, and a sulfonic acid equivalent weight of 1.9 meq/g.

Example 1

10 g of the polyarylene having a sulfonic group prepared in Synthetic Example 2, 0.5 g of titania particles having an average primary particle diameter of 0.007 μm and 60 mL of N-methyl-2-pyrrolidone were added and stirred for 30 min by a disperser and thereby homogenously dispersed.

The dispersed solution was casted on a PET film by a bar coater method and dried at 80° C. for 30 min and at 150° C. for 60 min to prepare a titania containing proton conductive membrane containing 5% by weight of titania particles.

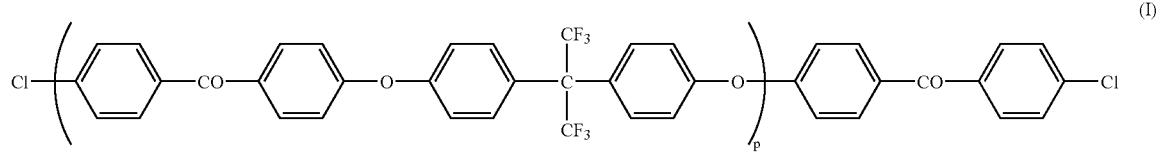

(I)

Synthesis Example 2

A 1-L three-necked flask equipped with a stirrer, a thermometer, a cooling tube, a Dean-stark tube and a three-way nitrogen inlet tube, was charged, in a nitrogen atmosphere, The titania containing proton conductive membrane was immersed in pure water containing a platinum ammine complex in an amount 20 times when 1 mol of a platinum complex was exchanged per 2 mol of sulfonic acid in the above titania containing proton conductive membrane, and subjected to replacement and adsorption. The membrane was washed with pure water for 4 hr or more, and put into pure water containing 20 times by equivalent weight of hydrazine and immersed at 60° C. for 5 hr and thereby a platinum complex was deposited in the titania composite solid electrolyte. The sulfonic group was protonated by treatment with hydrochloric acid having a 4 mol concentration and then sufficiently washed with pure water followed by drying.

In this way, a platinum and titania-containing proton conductive membrane was prepared. The platinum and titania-containing proton conductive membrane had a platinum content of 5.8% by weight, and a titania content of 5% by weight. With regard to a fuel cell prepared using the platinum and titania-containing proton conductive membrane, the resistance value when the current was not taken was measured at 80° C. without humidification and it was 0.14 Ωcm².

Example 2

10 g of polyarylene having a sulfonic group prepared in Synthesis Example 2, 0.5 g of silica particles having an average primary particle diameter of 0.007 μm, and 60 mL of N-methyl-2-pyrrolidone were added and stirred for 30 min by a disperser and thereby homogenously dispersed to prepare a silica particle containing conductive membrane.

Next, the procedure of Example 1 was repeated to prepare a platinum and silica containing proton conductive membrane. This platinum and silica containing proton conductive membrane had a platinum content of 5.8% by weight and a silica content of 5% by weight.

With regard to a fuel cell prepared using the platinum and silica-containing proton conductive membrane, the resistance value when the current was not taken was measured at 80° C. without humidification and it was 0.14 Ωcm².

Example 3

The polyarylene having a sulfonic group prepared in Synthesis Example 2 was added to N-methyl-2-pyrrolidone and dissolved therein. The solution was casted on a PET film by a bar coater method and dried at 80° C. for 30 min and at 150° C. for 60 min to prepare a proton conductive membrane. Next, the procedure of Example 1 was repeated to prepare a platinum-containing proton conductive membrane. This platinum containing proton conductive membrane had a platinum content of 5.8% by weight.

With regard to a fuel cell prepared using the platinum containing proton conductive membrane, the resistance value when the current was not taken was measured at 80° C. without humidification and it was 0.18 Ωcm².

Comparative Example 1

The polyarylene having a sulfonic group prepared in Synthesis Example 2 was added to N-methyl-2-pyrrolidone and dissolved therein. The solution was casted on a PET film by a bar coater method and dried at 80° C. for 30 min and at 150° C. for 60 min to prepare a uniform proton conductive membrane.

With regard to a fuel cell prepared using the proton conductive membrane, the resistance value when the current was not taken was measured at 80° C. without humidification and it was 35 Ωcm².

The above results are shown in Table 1 together with the results on the resistance values resulted in the measurement at 80° C. at a humidity of 90% when the current was not taken out.

TABLE 1

|  | Ex. 1 | Ex. 2 | Ex. 3 | Comp. Ex. 1 |
|---|---|---|---|---|
| 80° C. under a humidity of 90% (Ω cm²) | 0.03 | 0.03 | 0.03 | 0.04 |
| 80° C. under no humidity (Ω cm²) | 0.14 | 0.14 | 0.18 | 35 |

Under humidification, both of the proton conductive membranes containing the metal catalyst and metal oxide prepared in the examples and the proton conductive membrane prepared in the comparative example showed the similar membrane resistance, while without humidification, the proton conductive membrane prepared in the comparative example had higher membrane resistance as compared with the proton conductive membranes prepared in the examples. Therefore, the effect of the present invention was confirmed. In the proton conductive membrane prepared in the examples, it is considered that water is generated by the platinum catalyst in the proton conductive membrane from hydrogen gas and oxygen gas crosses-over to the proton conductive membrane, and the generated water was maintained by silica or titanium to prevent the proton conductive membrane from drying.

The invention claimed is:

1. A proton conductive composition comprising:
    100 parts by weight of a polyarylene having a sulfonic group;
    0.01 to 80 parts by weight of at least one metal catalyst selected from the group consisting of platinum, gold, palladium, rhodium, iridium and ruthenium; and
    0.01 to 50 parts by weight of fine particles of a metal oxide and/or fibers of the metal oxide in total;
    wherein the polyarylene having a sulfonic group comprises:
    a structural unit represented by the following formula (A) and optionally a structural unit represented by the following formula (B):

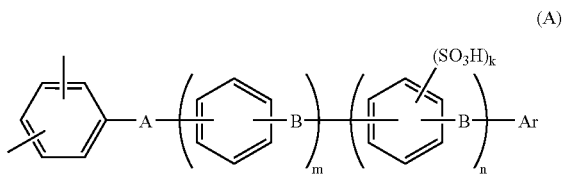

(A)

wherein A is a divalent electron-withdrawing group; B is a divalent electron-donating group or a direct bond; Ar is an aromatic group with a substituent —SO₃H; m is an integer of 0 to 10; n is an integer of 0 to 10; and k is an integer of 1 to 4;

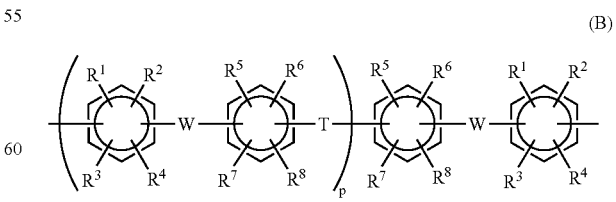

(B)

wherein $R^1$ to $R^8$ may be the same or different and each are at least one atom or group selected from the group consisting of hydrogen, a fluorine atom, alkyl group, fluorine substituted alkyl group, allyl group, aryl group and cyano group; W is a divalent electron-withdrawing group or a single bond; T is a single bond or a divalent organic group; and p is 0 or a positive integer.

2. The proton conductive composition according to claim 1 wherein the metal oxide is at least one selected from the group consisting of silica, titania, alumina, zirconia, magnesia and tin oxide.

3. The proton conductive composition according to claim 1 wherein the metal oxide is silica or titania.

4. The proton conductive composition according to claim 1 wherein the fine particles of the metal oxide have an average particle diameter of not more than 0.1 μm and the fibers of the metal oxide have a diameter of not more than 6 μm.

5. The proton conductive composition according to claim 1 wherein the metal catalyst has an average particle diameter of not more than 0.1 μm.

6. A proton conductive membrane comprising a proton conductive composition as claimed in claim 1.

* * * * *